United States Patent
Ye et al.

(10) Patent No.: US 7,460,976 B2
(45) Date of Patent: Dec. 2, 2008

(54) SEMI-DEFINITE PROGRAMMING METHOD FOR AD HOC NETWORK NODE LOCALIZATION

(75) Inventors: Yinyu Ye, Menlo Park, CA (US); Pratik Biswas, Stanford, CA (US)

(73) Assignee: The Board of Trustees of the Leland Stanford Jr. University, Palo Alto, CA (US)

(*) Notice: Subject to any disclaimer, the term of this patent is extended or adjusted under 35 U.S.C. 154(b) by 591 days.

(21) Appl. No.: 10/864,836

(22) Filed: Jun. 9, 2004

(65) Prior Publication Data
US 2005/0288888 A1    Dec. 29, 2005

(51) Int. Cl.
*G06F 3/01* (2006.01)

(52) U.S. Cl. .................. 702/150; 702/151; 702/179; 702/183

(58) Field of Classification Search ........... 702/109, 702/116, 150, 153, 179, 189, 152, 151, 183; 342/96; 700/100; 715/532
See application file for complete search history.

(56) References Cited

U.S. PATENT DOCUMENTS

| | | | | |
|---|---|---|---|---|
| 5,537,119 | A * | 7/1996 | Poore, Jr. .................. | 342/96 |
| 6,064,809 | A * | 5/2000 | Braatz et al. .............. | 703/2 |
| 6,704,692 | B1 * | 3/2004 | Banerjee et al. .......... | 702/189 |
| 2004/0250207 | A1 * | 12/2004 | Gilbert et al. ............ | 715/532 |

OTHER PUBLICATIONS

Y. Alfakih, A. Khandani and H. Wolkowicz Solving Euclidean Distance Matrix Completion Problems via Semidefinite Programming. *Comput. Optim. Appl.*, 12(13):13-20, Nov. 1999.
S. J. Benson, Y. Ye and X. Zhang, Solving Large-Scale Sparse Semidefinite Programs for Combinatorial Optimization. *SIAM Journal on Optimization*, 10(2): 443-461, 2000.
D. Bertsimas and Y. Ye. Semidefinite Relaxations, Multivariate Normal Distributions, and Order Statistics. *Handbook of Combinatorial Optimization*, 3:1-19, 1998.
S. Boyd, L. E. Ghaoui, E. Feron and V. Balakrishnan, *Linear Matrix Inequalities in System and Control* Theory, SIAM., 1994.
N. Bulusu, J. Heidemnn, and D. Estrin, GPS-less Low-Cost Outdoor Localization for Very Small Devices. Technical report, Computer Science Department, University of Southern California, Apr. 2000.
L. Doherty, L. E. Ghaoui and S. J. Pister. Convex Position Estimation in Wireless Sensor Networks. In *IEEE Infocom*, vol. 3, pp. 1655-1663, Apr. 2001.

(Continued)

*Primary Examiner*—Eliseo Ramos-Feliciano
*Assistant Examiner*—Felix Suarez
(74) *Attorney, Agent, or Firm*—Wong, Cabello, Lutsch, Rutherford, & Brucculeri, LLP

(57) ABSTRACT

The present invention uses a Semidefinite Programming (SDP) relaxation based method for the position estimation problem in sensor networks wherein the original problem is converted into a convex optimization problem. Estimation errors can be calculated, such that the quality of the solution to the initial problem is known. The sensor network may be divided into clusters such that the position estimation problem and the computation work can be distributed. The distributed scheme is highly scalable. A network with thousands of sensors may be solved within several minutes.

44 Claims, 23 Drawing Sheets

OTHER PUBLICATIONS

D. Ganesan, B. Krishnamachari, A. Woo, D. Culler, D. Estrin, and S. Wicker. An Empirical Study of Epidemic Algorithms in Large Scale Multihop Wireless Networks. Technical Report, University of California, Los Angeles, 2002.

J. Hightower and G. Borriello. Location Systems for Ubiquitous Computing. *IEEE Computer*, 34(8): 57-66, Aug. 2001.

A. Howard, M. Mataric, and G. Sukhatme. Relaxation on a Mesh: a Formalism for Generalized Localization. *In IEEE/RSJ Int'l Conf. on Intelligent Robots and Systems*, vol. 3, pp. 1055-1060, Oct. 2001.

M. Laurent. Matrix Completion Problems. *The Encyclopedia of Optimization*, 3:221-229, 2001.

J. More and Z. Wu. Global Continuation for Distance Geometry Problems. SIAM Journal on Optimization., 7:814-836, 1997.

D. Niculescu and B. Nath. Ad Hoc Positioning System (APS). In *IEEE Globecom*(1), pp. 2926-2931, 2001.

C. Savarese, J. Rabay, and K. Langendoen. Robust Positioning Algorithms for Distributed Ad-Hoc Wireless Sensor Networks. In *USENIX Technical Annual Conference*, Jun. 2002.

A. Savvides, C.-C. Han, and M. B. Srivastava. Dynamic Fine-Grained Localization in Ad-Hoc Networks of Sensors. In *Mobile Computing and Networking*, pp. 166-179, 2001.

A. Savvides, H. Park, and M. B. Srivastava. The Bits and Flops of the N-Hop Multilateration Primitive for Node Localization Problems. In *Proceedings of the 1st ACM International Workshop on Wireless Sensor Networks and Applications*, pp. 112-121. ACM Press. 2002.

Y. Shang, W. Ruml, Y. Zhang, and M. P. J. Fromherz. Localization From Mere Connectivity. In *Proceedings of the 4th ACM International Symposium on Mobile Ad Hoc Networking & Computing*, pp. 201-212. ACM Press, 2003.

J. F. Sturm. Let Sedumi Seduce You, Oct. 2001. http://fewcal.kub.nl/sturm/software/sedumi.html.

G. Xue and Y. Ye. An Efficient Algorithm for Minimizing a Sum of Euclidean Norms with Applications. *SIAM Journal on Optimization.*, 7:1017-1036, 1997.

\* cited by examiner

SEMI-DEFINITE PROGRAMMING METHOD FOR AD HOC NETWORK NODE LOCALIZATION

CROSS-REFERENCE TO RELATED APPLICATIONS

None

BACKGROUND OF THE INVENTION

1. Field of the Invention

This invention relates to node position determination in a network, especially a wireless sensor network and a semi-definite programming method.

2. Description of the Related Art

There has been an increase in the use of ad hoc wireless sensor networks for monitoring environmental information (temperature, pressure, mineral content, sound levels, light etc) across an entire physical space. Typical networks of this type consist of a large number of densely deployed sensor nodes which must gather local data and communicate with other nodes. The sensor data from these nodes are relevant only if we know what location they refer to. Therefore knowledge of the node positions becomes imperative. The use of Global Positioning System (GPS) is a very expensive solution to this requirement. Instead, techniques to estimate node positions are being developed that rely just on the measurements of distances between neighboring nodes. The distance information could be based on criterion like time of arrival, time-difference of arrival and received signal strength. Depending on the accuracy of these measurements, processor power and memory constraints at each of the nodes, there is some degree of error in the distance information. Furthermore, it is assumed that the positions of a few anchor nodes are known. The problem of finding the positions of all the nodes given a few anchor nodes and relative distance information between the nodes is called the position estimation or localization problem.

Position Estimation or Localization Problem

This position estimation may be expressed with the following equations. The trace of a given matrix A denoted by Trace (A), is the sum of the entries on the main diagonal of A. We use I, e and 0 to denote the identity matrix, the vector of all ones and the vector of all zeros, whose dimension will be clear in the context. The inner product of two vectors p and q is denoted by $<p, q>$. The 2-norm of a vector x denoted by $\|x\|$ is defined by $\sqrt{<x,x>}$. A positive semidefinite matrix X is represented by $X \geq 0$.

A great deal of research has been done on the topic of position estimation in ad-hoc networks. See for example: L. Doherty, L. E. Ghaoui, and S. J. Pister. Convex position estimation in wireless sensor networks. In IEEE *Infocom*, volume 3, pages 1655-1663, April 2001 ("Doherty et al."); and D. Ganesan, B. Krishnamachari, A. Woo, D. Culler, D. Estrin, and S. Wicker. An empirical study of epidemic algorithms in large scale multiho wireless networks. Technical report, University of California, Los Angeles, 2002. Most techniques use distance or angle measurements from a fixed set of reference or anchor nodes; or employ a grid of beacon nodes with known positions One closely related approach is described by Doherty et al. wherein the proximity constraints between nodes which are within 'hearing distance' of each other are modeled as convex constraints. Then a feasibility problem can be solved by efficient convex programming techniques. Suppose two nodes $x_1$ and $x_2$ are within radio range R of each other, the proximity constraint can be represented as a convex second order cone constraint of the form:

$$\|(x_1-x_2)\|_2 \leq R \quad (1)$$

This can be formulated as a matrix linear inequality:

$$\begin{bmatrix} I_2 R & x_1 - x_2 \\ (x_1 - x_2)^T & R \end{bmatrix} \geq 0 \quad (2)$$

Alternatively, if the exact distance $r_{1,2} \leq R$ is known, we could set the constraint $$\|(x_1-x_2)\|_2 \leq r_{1,2} \quad (3)$$

The second-order cone method for solving Euclidean metric problems can be also found in G. Xue and Y. Ye. An efficient algorithm for minimizing a sum of Euclidean norms with applications. *SIAM Journal on Optimization.*, 7:1017-1036, 1997, where its superior polynomial complexity efficiency is presented, which is incorporated by reference herein.

However, this technique yields good results only if the anchor nodes are placed on the outer boundary, since the estimated positions of their convex optimization model all lay within the convex hull of the anchor nodes. So if the anchor nodes are placed to the interior of the network, the position estimation of the unknown nodes will also tend to be the interior, yielding highly inaccurate results. For example, with just 5 anchors in a random 200 node network, the estimation error is almost twice the radio range.

One may ask why not add, if $r_{1,2}$ is known, another "bounding away" constraint $$\|(x_1-x_2)\|_2 \geq r_{1,2} \quad (4)$$

These two constraints (Equation (3) and (4)) are much tighter and would yield more accurate results. The problem is that the latter is not a convex constraint, so that the efficient convex optimization techniques cannot apply.

Shang et al. (Y. Shang, W. Ruml, Y. Zhang, and M. P. J. Fromherz. Localization from mere connectivety. In *Proceedings of the 4th ACM international symposium on Mobile Ad Hoc Networking & Computing*, pages 201-212. ACM Press, 2003.) demonstrate the use of a data analysis technique called "multidimensional scaling" (MDS) in estimating positions of unknown nodes. Firstly, using basic connectivity or distance information, a rough estimate of relative node distances is made. Then MDS is used to obtain a relative map of the node positions. Finally an absolute map is obtained by using the known node positions. This technique works well with few anchors and reasonably high connectivity. For instance, for a connectivity level of 12 and 2% anchors, the error is about half of the radio range.

The techniques described above are predominantly centralized although distributed versions can be developed. The available distance information between all the nodes must be present on a single computer for these techniques to work. The distributed approach has the advantage that the techniques can be executed on the sensor nodes themselves thus removing the need to relay all the information to a central computer. Many techniques have been proposed that try to emphasize the ad-hoc nature of computation required in them.

Niculescu and Nath (D. Niculescu and B. Nath. Ad hoc positioning system (APS). In *IEEE GLOBECOM* (1), pages 2926-2931, 2001.) describe the "DV-Hop" approach which is quite effective in dense and regular topologies. The anchor nodes flood their position information to all the nodes in the network. Each node then estimates its own position by performing a triangulation to three or more anchors. For more irregular topologies however, the accuracy can deteriorate to the radio range.

Savarese et al. (C. Savarese, J. Rabay, and K. Langendoen. Robust positioning algorithms for distributed ad-hoc wireless sensor networks. In *USENIX Technical Annual Conference*, June 2002.) present a two-phase algorithm in which the start-up phase involves finding the rough positions of the nodes using a technique similar to the "DV-Hop" approach. The refinement phase improves the accuracy of the estimated positions by performing least squares triangulations using its own estimates and the estimates of the nodes in its own neighborhood. This method can accurately estimate points within one third of the radio range.

When the number of anchor nodes is high, the "iterative multiplication" technique proposed by Savvides et al. (A. Savvides, C.-C. Han, and M. B. Srivastava. Dynamic fine-grained localization in ad-hoc networks of sensors. In *Mobile Computing and Networking*, pages 166-179, 2001.) yields good results. Nodes that are connected to three or more anchors compute their position by triangulation and upgrade themselves to anchor nodes. Now their position information can also be used by the other unknown nodes for their position estimation in the next iteration.

Although there are many ways to solve the position estimation problem in a sensor network as described above, these various ways still have many deficiencies. For example, some of these methods are either not scalable or not distributed. As the number of nodes in the network increases, it becomes increasingly difficult to find a solution. Also the communication overhead increases substantially. Another problem for some of these approaches is the accuracy in the estimation, as described above. In some situations, the errors can be as big as the radio range or more. A third problem is the lack of an indication of the accuracy of each position estimation. Without the knowledge of how accurate the position estimation is, the use of the resulting estimation is very limited.

It is desirable to have a new method, system or device to advance the relevant art. It is desirable to have a method, system or device that can solve the position estimation problem efficiently, in either small or large sensor network, and that can provide an indication of the accuracy of the solution.

BRIEF SUMMARY OF THE INVENTION

The methods, devices and systems according to the present invention use a Semidefinite Programming (SDP) with a semidefinite relaxation for solving the position estimation problem in sensor networks. The optimization problem is set up to minimize the error in sensor positions. Observable gauges are developed to measure the quality of the position estimation. According to one embodiment of the current invention, the nonconvex quadratic distance constraints are converted into linear constraints by introducing a relaxation to remove the quadratic term in the formulation. The performance of this technique is highly satisfactory compared to other techniques. Very few anchor nodes are required to accurately estimate the position of all the unknown nodes in a network.

According to one embodiment of the invention, estimation errors can be calculated, such that the quality of the solution to the initial problem can be known. When there is a solution, the estimation errors are minimal even when the anchor nodes are not suitably placed within the network.

According to another embodiment of the current invention, the network is divided into clusters. The anchors are divided into many clusters according to their physical positions, and some sensors are assigned into these clusters if a sensor has a direct connection to one of the anchors. The SDP method is used independently at each cluster, and fixes those sensors' positions which have high accuracy measures according to the SDP computation. These positioned sensors become "ghost anchors" and are used to decide the remaining unpositioned sensors. The distributed scheme is then repeated. The distributed scheme is highly scalable. A network with thousands of sensors may be solved within several minutes.

In the distributed system, the computation of the sensor positions of each cluster may be carried out by an anchor or one of the sensors, which may be referred as a local station, such that the distance data of all sensors need only transmitted to the local station, not the central station. Only the solutions of the sensor position estimations are transmitted to other clusters or central station. The network traffic within the sensor network is greatly reduced.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Figure 9:
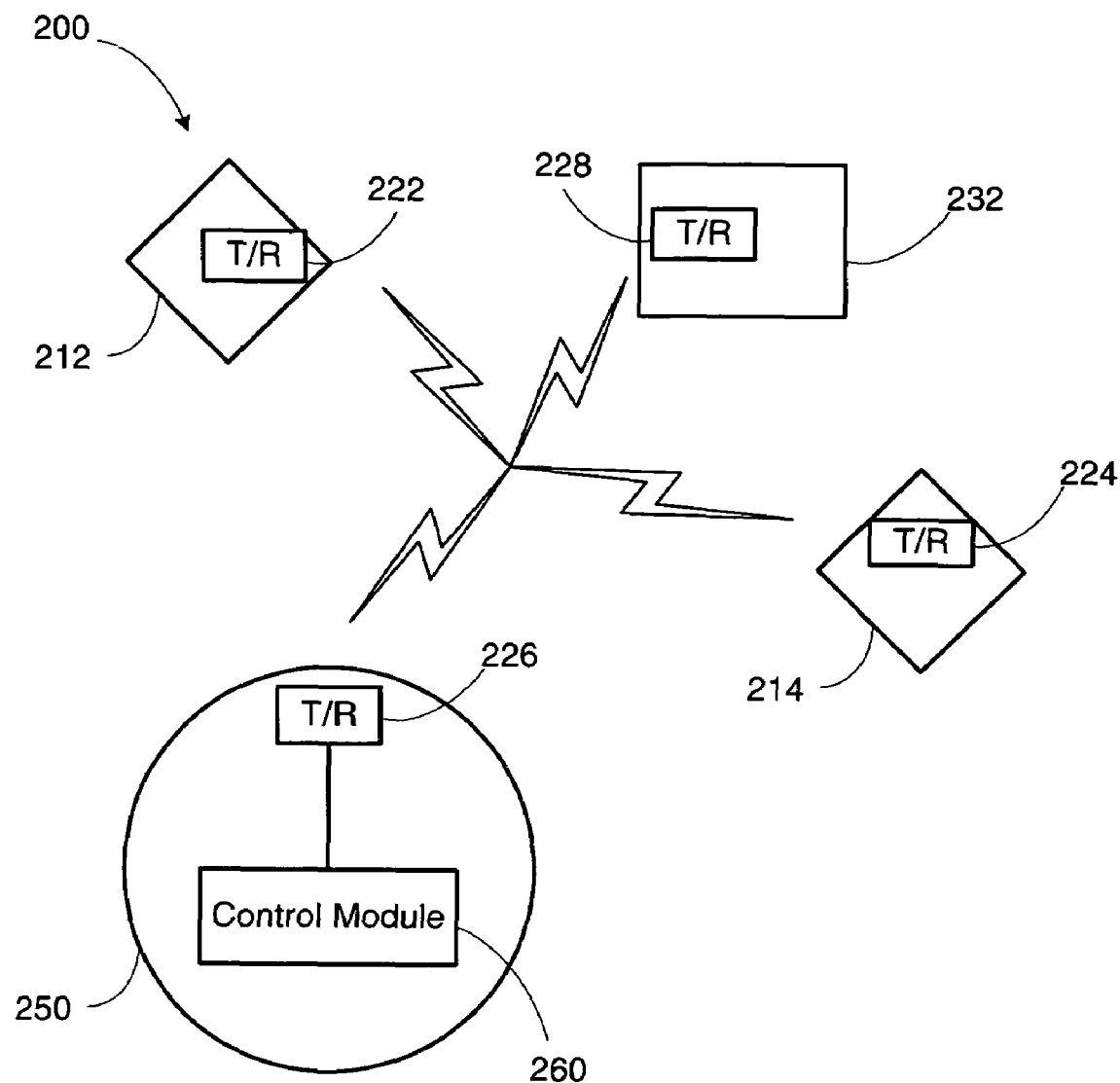
FIG. 9 shows a portion of a sensor work.

A small portion of a typical sensor network 200 is shown in FIG. 9. The sensor network 200 contains anchors 212 and 214, which are sensors with known positions, also known as known sensors. The network 200 also contains unknown sensor 232, whose position is not known and needs to be determined using various methods, a few of which are disclosed in the current invention. Each sensor, an anchor or an unknown sensor has a network interface (222, 224 and 228), through which the sensor can exchange data with other sensors or a control station 250. Similarly, the control station 250 communicates with others through an interface 226. The control station 250 may be an independent physical device as shown in FIG. 9 residing in a central location, such as a central office. It may also physically reside on an anchor 212 or 214, in which case, it shares the network interface with the anchor and does not have an independent network interface. In another word, an anchor and a control station may be combined and sharing some of the common components.

The control station 250 has a control module 260 coupled to the network interface 226. The control module 260 performs most of the data processing, controlling and management tasks of the sensor network for carrying out its designed purpose. The control module 260 is the work horse in solving the position estimation problem, among other tasks. A control module 260 may be implemented as a software program on a digital computer, where the control module employs the software resources (e.g. operating system) and hardware resources (e.g. processor, memory, mass storage) in a computer to perform its calculation and management tasks. A control station 250 may be implemented as an application specific instrument with a digital computer embedded inside the instrument. A control station 250 may also be implemented using a general purpose computer with a few application specific add-on hardware peripherals and software programs.

Through the network interfaces (e.g. 222, 224, 226, 228), anchors (212, 214), unknown sensors (232) and control stations (250) can communicate with each other. For simplicity, in the example depicted in FIG. 9, the network interfaces use wireless radio link to communicate with each other. There are many other ways to communicate with each other, through electrical wires, wireless electromagnetic waves (e.g. RF, light), wireless mechanical waves (sound) or any combinations. In FIG. 9, all sensors have a direct link to the control station 250. This is not desirable, required or possible in all situations. Typically, any sensors or control stations in a sensor network can communicate with only those that are within its neighborhood. A neighborhood typically refers to a group of sensors that have direct communication with each other. Neighborhood sensors of a control station may also refer to all sensors that have direct communication with that control station. The control station can receive information from sensors or control stations that are outside its neighborhood via some sensors within its neighborhood relaying such information.

Once a sensor network is deployed for a certain purpose, the positions of the anchors are determined through some methods, for example GPS, or the anchors are placed in known locations in the first place. The unknown sensors will communicate with each other, with anchors and with control stations to generate distance measurements between them. Typically, the distance measurement has a range limitation, which is typically the limitation of the method of communication. E.g. the radio communication between two sensors is limited by the power of the radio transceiver. Beyond that range, radio signal from one sensor cannot be received by another. So the distance between these two sensors is not known to each other directly except their distance is larger than the radio communication limit. The positions of anchors, typically in the form of coordinates of the positions, the distances between any pairs of sensors are communicated to the control station 250. With such information, the control station can determine the positions of the unknown sensors using the methods of the current invention as discussed in more detail below.

Semidefinite Program (SDP) Relaxation

According to embodiments of the current invention, the position estimation problem is solved using Semidefinite Program (SDP) relaxation. Observable gauges to measure the quality of the distance data obtained are developed. Furthermore, a distributed process is used for solving a sensor network with large number of sensors. Usual quadratic formulations of the position estimation problem are presented, then their semidefinite programming (SDP) models are presented.

The embodiments of the current invention may be applicable to any position estimation problems, where the sensors may be in any physical locations. The sensors may be in a three-dimensional volume, such as in oceanic survey. The sensors may be in a two-dimensional surface. They may be in a plane surface or non-plane surface such as a spherical surface. In all these difference situations, the application of the embodiments of the current invention is the same, except the way the distance between a pair of sensors is calculated. It is well known in the art regarding how a distance between two points is calculated in various situations. So distance calculation is not discussed here.

For simplicity, let the sensor points be placed on a plane. Suppose we have m known points which can be configured to be anchors, $a_k \in R^2$, $k=1, \ldots, m$, and n unknown points or sensors $x_j \in R^2$, $j=1, \ldots, n$. For a pair of two points in $N_e$, we have a Euclidean distance measure $\hat{d}_{kj}$ between $a_k$ and $x_j$ or $\hat{d}_{ij}$ between $x_i$ and $x_j$; and for a pair of two points in $N_l$, we have a distance lower bound $\underline{r}_{kj}$ between $a_k$ and $x_j$ or $\underline{r}_{ij}$ between $x_i$ and $x_j$; and for a pair of two points in $N_u$, we have a distance upper bound $\overline{r}_{kj}$ between $a_k$ and $x_j$ or $\overline{r}_{ij}$ between $x_i$ and $x_j$. Then, the localization problem is to find $x_j$s such that $$\|x_i - x_j\|^2 = (\hat{d}_{ij})^2, \|a_k - x_j\|^2 = (\hat{d}_{kj})^2, \forall (i,j),(k,j) \in N_e$$

$$\|x_i - x_j\|^2 \geq (\underline{r}_{ij})^2, \|a_k - x_j\|^2 \geq (\underline{r}_{kj})^2, \forall (i,j),(k,j) \in N_l$$

$$\|x_i - x_j\|^2 \leq (\overline{r}_{ij})^2, \|a_k - x_j\|^2 \leq (\overline{r}_{kj})^2, \forall (i,j),(k,j) \in N_u \quad (5)$$

Since these measures and bounds are typically noisy, a "softer" model would be to choose $x_j$s such that the sum of errors is minimized:

$$\min \sum_{i,j \in N_e, i<j} \left| \|x_i - x_j\|^2 - (\hat{d}_{ij})^2 \right| + \sum_{k,j \in N_e} \left| \|a_k - x_j\|^2 - (\hat{d}_{kj})^2 \right| + \quad (6)$$

$$\sum_{i,j \in N_l, i<j} (\|x_i - x_j\|^2 - (\underline{r}_{ij})^2)_- + \sum_{k,j \in N_l} (\|a_k - x_j\|^2 - (\underline{r}_{kj})^2)_- +$$

$$\sum_{i,j \in N_u, i<j} (\|x_i - x_j\|^2 - (\overline{r}_{ij})^2)_+ + \sum_{k,j \in N_u} (\|a_k - x_j\|^2 - (\overline{r}_{kj})^2)_+,$$

where $(u)_-$ and $(u)_+$ are defined as $$(u)_- = \max\{0, -u\} \text{ and } (u)_+ = \max\{0, u\}. \quad (7)$$

Note that if each of these errors is squared, the minimization problem becomes a least squares problem. In embodiments according to this invention, we choose minimizing the sum of absolute errors to show how the SDP model works. As known to a person skilled in the relevant arts, this is only a design choice. The use of squares of the errors is equivalent to the absolute values of the errors.

By introducing slack variables βs andβs, the softer error minimization problem can be rewritten as $$\text{Minimize:} \sum_{i,j \in N_e, i<j} (\alpha_{ij}^+ + \alpha_{ij}^-) + \sum_{k,j \in N_e} (\alpha_{kj}^+ + \alpha_{kj}^-) + \quad (8)$$

$$\sum_{i,j \in N_l, i<j} \beta_{ij}^- + \sum_{k,j \in N_l} \beta_{kj}^- + \sum_{i,j \in N_u, i<j} \beta_{ij}^+ + \sum_{k,j \in N_u} \beta_{kj}^+$$

$$\text{Subject to:} \|x_i - x_j\|^2 - (\hat{d}_{ij})^2 = \alpha_{ij}^+ - \alpha_{ij}^-, \forall i, j \in N_e, i < j$$

$$\|a_k - x_j\|^2 - (\hat{d}_{kj})^2 = \alpha_{kj}^+ - \alpha_{kj}^-, \forall k, j \in N_e,$$

-continued $$\|x_i - x_j\|^2 - (r_{ij}^-)^2 \geq -\beta_{ij}^-, \forall i, j \in N_l, i < j$$

$$\|a_k - x_j\|^2 - (r_{kj}^-)^2 \geq -\beta_{kj}^-, \forall k, j \in N_l,$$

$$\|x_i - x_j\|^2 - (r_{ij}^+)^2 \leq \beta_{ij}^+, \forall i, j \in N_u, i < j,$$

$$\|a_k - x_j\|^2 - (r_{kj}^+)^2 \leq \beta_{kj}^+, \forall k, j \in N_u$$

$$\alpha_{ij}^+, \alpha_{ij}^-, \alpha_{kj}^+, \alpha_{kj}^-, \beta_{ij}^-, \beta_{kj}^-, \beta_{ij}^+, \beta_{kj}^+ \geq 0,$$

Let $X = [x_1 \ x_2 \ \ldots \ x_n]$ be the 2×n matrix that needs to be determined. Then $$\|x_i - x_j\|^2 = e_{ij}^T X^T X e_{ij}, \quad (9)$$

$$\|a_i - x_j\|^2 = (a_i; e_j)^T [I \ X]^T [I \ X](a_i; e_j), \quad (10)$$

where $e_{ij}$ is the vector with 1 at the ith position, −1 at the jth position and zero everywhere else; and $e_j$ is the vector of all zero except −1 at the jth position.

Let $Y = X^T X$. Then problem (5) can be rewritten as:

$$\min. \sum_{i,j \in N_e, i<j} (\alpha_{ij}^+ + \alpha_{ij}^-) + \sum_{k,j \in N_e} (\alpha_{kj}^+ + \alpha_{kj}^-) + \quad (11)$$

$$\sum_{i,j \in N_l, i<j} \beta_{ij}^- + \sum_{k,j \in N_l} \beta_{kj}^- + \sum_{i,j \in N_u, i<j} \beta_{ij}^+ + \sum_{k,j \in N_u} \beta_{kj}^+$$

Subject to: $e_{ij}^T X^T X e_{ij} - (\hat{d}_{ij})^2 = \alpha_{ij}^+ - \alpha_{ij}^-, \forall i, j \in N_e, i < j$ $(a_k; e_j)^T [I \ X]^T [I \ X](a_k; e_j) - (\hat{d}_{kj})^2 = \alpha_{kj}^+ - \alpha_{kj}^-,$ $\forall k, j \in N_e,$ $e_{ij}^T X^T X e_{ij} - (r_{ij}^-)^2 \geq -\beta_{ij}^-, \forall i, j \in N_l, i < j$ $(a_k; e_j)^T [I \ X]^T [I \ X](a_k; e_j) - (r_{kj}^-)^2 \geq -\beta_{kj}^-,$ $\forall k, j \in N_l,$ $e_{ij}^T X^T X e_{ij} - (r_{ij}^+)^2 \leq \beta_{ij}^+, \forall i, j \in N_u, i < j,$ $(a_k; e_j)^T [I \ X]^T [I \ X](a_k; e_j) - (r_{kj}^+)^2 \leq \beta_{kj}^+, \forall k, j \in N_u$ $\alpha_{ij}^+, \alpha_{ij}^-, \alpha_{kj}^+, \alpha_{kj}^-, \beta_{ij}^-, \beta_{kj}^-, \beta_{ij}^+, \beta_{kj}^+ \geq 0,$ $Y = X^T X.$ Through the above transformation, the original quadratic problem becomes an optimization problem. A numeric solution to an optimization problem is much easier to get using a computer than a solution to a quadratic problem.

Unfortunately, the above problem is not a convex optimization problem. Doherty et al. essentially ignore the nonconvex inequality and equality constraints but keep the convex ones, resulting in a convex second-order cone optimization problem, where all position estimations only lie in the convex hull of anchors. Others have essentially used various types of nonlinear equation and global optimization solvers to solve similar quadratic models, where final solutions are highly dependent on initial solutions and search directions.

Our method is to relax problem (11) to a semidefinite program:

Change $Y = X^T X$ in (11) to $Y \succeq X^T X$.

This matrix inequality is equivalent to (e.g., Boyd et al. [5])

$$Z := \begin{pmatrix} I & X \\ X^T & Y \end{pmatrix} \succeq 0. \quad (12)$$

Then, the problem of (11) can be written as a standard SDP problem:

$$\min. \sum_{i,j \in N_e, i<j} (\alpha_{ij}^+ + \alpha_{ij}^-) + \sum_{k,j \in N_e} (\alpha_{kj}^+ + \alpha_{kj}^-) + \quad (13)$$

$$\sum_{i,j \in N_l, i<j} \beta_{ij}^- + \sum_{k,j \in N_l} \beta_{kj}^- + \sum_{i,j \in N_u, i<j} \beta_{ij}^+ + \sum_{k,j \in N_u} \beta_{kj}^+$$

s.t. $(1; 0; 0)^T Z (1; 0; 0) = 1$ $(0; 1; 0)^T Z (0; 1; 0) = 1$ $(1; 1; 0)^T Z (1; 1; 0) = 2$ $(0; e_{ij})^T Z (0; e_{ij}) - \alpha_{ij}^+ + \alpha_{ij}^- = (\hat{d}_{ij})^2, \forall i, j \in N_e, i < j,$ $(a_k; e_j)^T Z (a_k; e_j) - \alpha_{kj}^+ + \alpha_{kj}^- = (\hat{d}_{kj})^2, \forall k, j \in N_e,$ $(0; e_{ij})^T Z (0; e_{ij}) + \beta_{ij}^- \geq (r_{ij}^-)^2, \forall i, j \in N_l, i < j,$ $(a_k; e_j)^T Z (a_k; e_j) + \beta_{kj}^- \geq (r_{kj}^-)^2, \forall k, j \in N_l,$ $(0; e_{ij})^T Z (0; e_{ij}) - \beta_{ij}^+ \leq (r_{ij}^+)^2, \forall k, j \in N_u,$ $(a_k; e_j)^T Z (a_k; e_j) - \beta_{kj}^+ \leq (r_{kj}^+)^2, \forall k, j \in N_u$ $\alpha_{ij}^+, \alpha_{ij}^-, \alpha_{kj}^+, \alpha_{kj}^-, \beta_{ij}^-, \beta_{kj}^-, \beta_{ij}^+, \beta_{kj}^+ \geq 0,$ $Z \succeq 0.$ A worst-case complexity result to solve the SDP relaxation can be derived from employing interior-point algorithms.

THEOREM 1. Let $k = 3 + |N_e| + |N_l| + |N_u|$, the number of constraints. Then, the worst-case number of total arithmetic operations to compute an $\epsilon$-solution of (13), meaning its objective value is at most $\epsilon (>0)$ above the minimal one, is bounded by $$O\left(\sqrt{n+k}(n^3 + n^2 k + k^3) \log \frac{1}{\epsilon}\right),$$

in which $$\sqrt{n+k} \log \frac{1}{\epsilon}$$

represents the bound on the worst-case number of interior-point algorithm iterations Practically, the number of interior-point algorithm iterations to compute a fairly accurate solution is a constant, 20-30, for semidefinite programming, and k is in the range of $O(n)$. Thus, the number of operations is typically bounded by $O(n^3)$ in solving a localization problem with n sensors.

Even though the number of unknown variables in the resulting SDP is substantially greater than the original quadratic problem, the number of operations in solving each problem does not increase as great. As will be shown below, the SDP can be solved much more efficiently, with great speed and accuracy. With an additional distributed method, the distributed SDP is actually very scalable.

SDP Model Analyses

The matrix of Z of (13) has $2n+n(n+1)/2$ unknown variables. Consider the case that among $\{k,i,j\}$, there are $2n+n(n+1)/2$ of the pairs in $N_e$, and the objective has zero value for the minimal solution of (13). Then we have at least $2n+n(n+1)/2$ linear equalities among the constraints. Moreover, if these equalities are linearly independent, then Z has a unique solution. Therefore, we can show PROPOSITION. If there are $2n+n(n+1)/2$ distance pairs each of which has an accurate distance measure and other distance bounds are feasible. Then, the minimal value of (13) is zero. Moreover, if (13) has a unique minimal solution $$\bar{Z} = \begin{pmatrix} I & \bar{X} \\ \bar{X}^T & \bar{Y} \end{pmatrix}, \tag{14}$$

then we must have $\bar{Y}=(\bar{X})^T\bar{X}$ and $\bar{X}$ equal true positions of the unknown sensors. That is, the SDP relaxation solves the original problem exactly.

PROOF. Let $X^*$ be the true locations of the n points, and $$Z^* = \begin{pmatrix} I & X^* \\ (X^*) & (X^*)^T X^* \end{pmatrix}. \tag{15}$$

Then $Z^*$ and all slack variables being zero is a feasible solution for (13).

On the other hand, since $\bar{Z}$ is the unique solution to satisfy the $2n+n(n+1)/2$ equalities, we must have $\bar{Z}=Z^*$ so that $\bar{Y}=(X^*)^TX^*=\bar{X}^T\bar{X}$. End of Proof We present a simple case to show what it means for the system has a unique solution. Consider $n=1$ and $m=3$. The accurate distance measures from unknown $b_1$ to known $a_1$, $a_2$ and $a_3$ are $d_{11}$, $d_{21}$, and $d_{31}$, respectively. Therefore, the three linear equations are $$y-2x^Ta_1=(d_{11})^2-\|a_1\|^2$$

$$y-2x^Ta_2=(d_{21})^2-\|a\|^2$$

$$y-2x^Ta_3=(d_{31})^2-\|a_3\|^2 \tag{17}$$

This system has a unique solution if it has a solution and the matrix $$\begin{pmatrix} 1 & 1 & 1 \\ a_1 & a_2 & a_3 \end{pmatrix} \tag{18}$$

is nonsingular. This essentially means that the three points $a_1$, $a_2$, and $a_3$ are not on the same line, and then $\bar{x}=b_1$ can be uniquely determined. Here, the SDP method reduces to the so-called triangular method. Proposition 1 and the example show that the SDP relaxation method has the advantage of the triangular method in solving the original problem.

Error Analyses

The case discussed in Proposition 1 is deterministic. Alternatively, each $x_j$ can be viewed a random point $\tilde{x}_j$ since the distance measures contain random errors. Then the solution to the SDP problem provides the first and second moment information on $\tilde{x}_j, j=1,\ldots,n$.

Generally, we have $$E[\tilde{x}_j] \sim \bar{x}_j, \quad j=1,\ldots,n \tag{19}$$

and $$E[\tilde{x}_i^T \tilde{x}_j] \sim \bar{Y}_{ij}, \quad i,j=1,\ldots,n. \tag{20}$$

where $$\bar{Z} = \begin{pmatrix} I & \bar{X} \\ \bar{X}^T & \bar{Y} \end{pmatrix} \tag{21}$$

is the optimal solution of the SDP problem. Thus, $$\bar{Y}-\bar{X}^T\bar{X} \tag{22}$$

represents the co-variance matrix of $\tilde{x}_j, j=1,\ldots,n$

These quantities also constitute error management and analyses of the original problem data. For example, $$\text{Trace}(\bar{Y}-\bar{X}^T\bar{X}) = \sum_{j=1}^{n}(\bar{Y}_{jj}-\|\bar{x}_j\|^2) \tag{23}$$

the total trace of the co-variance matrix, measures the quality of distance sample data $d_{ij}$ and $d_{kj}$. In particular, individual trace $$\bar{Y}_{jj}-\|\bar{x}_j\|^2, \tag{24}$$

which is also the variance of $\|\bar{x}_j\|$, helps us to detect possible distance measure errors, and outlier or defect sensors. These errors often occur in real applications either due to the lack of data information or noisy measurement, and are often difficult to detect since the true location of sensors is unknown.

We again use the same simple case to illustrate our theory. Consider $n=1$ and $m=3$. The inexact distance measures from unknown $b_1$ to known $a_1$, $a_2$, and $a_3$ are $d_{11}+\epsilon$, $d_{21}+\epsilon$ and $d_{31}+\epsilon$, respectively, where $\epsilon$ is a random error with zero mean. Therefore, the three linear equations are $$\bar{y}-2\bar{x}^Ta_1+\|a_1\|^2=(d_{11})^2+2\epsilon d_{11}+\epsilon^2$$

$$\bar{y}-2\bar{x}^Ta_2+\|a_2\|^2=(d_{21})^2+2\epsilon d_{21}+\epsilon^2$$

$$\bar{y}-2\bar{x}^Ta_3+\|a_3\|^2=(d_{31})^2+2\epsilon d_{31}+\epsilon^2 \tag{25}$$

Taking expect values on both sides, we have $$E[\bar{y}]-2E[\bar{x}]^Ta_1+\|a_1\|^2=(d_{11})^2+E[\epsilon^2]$$

$$E[\bar{y}]-2E[\bar{x}]^Ta_2+\|a_2\|^2=(d_{21})^2+E[\epsilon^2]$$

$$E[\bar{y}]-2E[\bar{x}]^Ta_3+\|a_3\|^2=(d_{31})^2+E[\epsilon^2] \tag{26}$$

or $$E[\bar{y}]E[\bar{x}]^TE[\bar{x}]+\|E[\bar{x}]-a_1\|^2=(d_{11})^2+E[\epsilon^2]$$

$$E[\bar{y}]E[\bar{x}]^TE[\bar{x}]+\|E[\bar{x}]-a_2\|^2=(d_{21})^2+E[\epsilon^2]$$

$$E[\bar{y}]E[\bar{x}]^TE[\bar{x}]+\|E[\bar{x}]-a_3\|^2=(d_{31})^2+E[\epsilon^2] \tag{27}$$

solution to the linear equation is $$E[\bar{x}]=b_1 \quad (28)$$

and $$E[\bar{y}]-E[\bar{x}]^T E[\bar{x}]=E[\epsilon^2] \quad (29)$$

or $$E[\bar{y}]=E[\epsilon^2]+\|b_1\|^2. \quad (30)$$

That is, $\bar{x}$ is a point estimate of $b_1$. Moreover, from $$E[\bar{y}]-E[\|\bar{x}\|^2]+E[\|\bar{x}\|^2]-\|b_1\|^2=E[\bar{y}]-\|b_1\|^2=E[\epsilon^2] \quad (31)$$

we have $$E[\bar{y}]-\|\bar{x}\|^2 \leq E[\epsilon^2] \text{ and } E[\|\bar{x}\|^2]-\|b_1\|^2 \leq E[\epsilon^2] \quad (32)$$

so that the quantity of $y-\|\bar{x}\|^2$ is a lower bound estimate for the error variance and the variance of $\bar{x}$ is also bounded by the error variance. This quantity gives an interval estimation of $b_1$.

More generally, we have

PROPOSITION 2. Let the noisy measurements $$\bar{d}_{ij}=d_{ij}+\epsilon_i+\epsilon_j, \forall i \neq j \quad (33)$$

and $$\bar{d}_{kj}=d_{kj}+\epsilon_j \forall k,j \quad (34)$$

where $d_{ij}$ are the true distances and $\epsilon_j$ are independent random errors with zero mean. Moreover, let the minimal value be zero in (13) and the anchor points are linear independent.

Then, we have $$E[\bar{x}_j]=b_j \text{ and } E[\bar{Y}_{jj}]=\|b_j\|^2+E[\epsilon_j^2] \forall j \quad (35)$$

and $$E[\bar{Y}_{ij}]=(b_i)^T b_j \forall i \neq j,$$

where $b_j$ is the true position of $x_j$, $=1, \ldots, n$, and $$\bar{Z} = \begin{pmatrix} I & \bar{X} \\ \bar{X}^T & \bar{Y} \end{pmatrix} \quad (36)$$

is the minimizer of (13).

PROOF. We have, for all i,j,k, $$\bar{Y}_{ii}-2\bar{Y}_{ij}+\bar{Y}_{jj}=(d_{ij}+\epsilon_i+\epsilon_j)^2 \quad (37)$$

$$\bar{Y}_{jj}-2\bar{x}_j^T a_k+\|a_k\|^2=(d_{kj}+\epsilon_j)^2. \quad (38)$$

Taking expect values on both sides, we have $$E[\bar{Y}_{ii}]-2E[\bar{Y}_{ij}]+E[\bar{Y}_{jj}]=(d_{ij})^2+E[\epsilon_i^2]+E[\epsilon_j^2], \quad (39)$$

and $$E[\bar{Y}_{jj}]-E[\bar{x}_j]^T E[\bar{x}_j]+\|E[\bar{x}_j]-a_k\|^2=(d_{kj})^2+E[\epsilon_j^2], \quad (40)$$

or $$E[\bar{Y}_{ii}]-2E[\bar{Y}_{ij}]+E[\bar{Y}_{jj}]-\|E[\bar{x}_i]-E[\bar{x}_j]\|^2+\|E[\bar{x}_j]+ \\ \|E[\bar{x}_i]\|^2=(d_{ij})^2+E[\epsilon_i^2]+E[\epsilon_j^2] \quad (41)$$

and $$E[\bar{Y}_{jj}]-E[\bar{x}_j]^T E[\bar{x}_j]+\|E[\bar{x}_j]-a_k\|^2=(d_{kj})^2+E[\epsilon_j^2]. \quad (42)$$

Thus, $$E[\bar{x}_j]=b_j \text{ and } E[\bar{Y}_{jj}]=\|b_j\|^2+E[\epsilon_j^2] \forall j \quad (43)$$

and $$E[\bar{Y}_{ij}]=(b_i)^T b_j \forall i \neq j \quad (44)$$

is the solution satisfying these equations.

Distributed SDP Method

The above SDP problem can be solved more efficiently using a distributed process. Recall that our unknown matrix has a form $$\begin{pmatrix} I & X \\ X^T & Y \end{pmatrix} \quad (45)$$

where it can be decomposed into K principle blocks $$\begin{pmatrix} I & X_1 & X_2 & \cdots & X_K \\ X_1^T & Y_{11} & Y_{12} & \cdots & Y_{1K} \\ X_2^T & Y_{21} & Y_{22} & \cdots & Y_{2K} \\ \cdots & \cdots & \cdots & \cdots & \cdots \\ X_K^T & Y_{K1} & Y_{K2} & \cdots & Y_{KK} \end{pmatrix} \quad (46)$$

where the $k^{th}$ principle block matrix is $$\begin{pmatrix} I & X_k \\ X_k^T & Y_{kk} \end{pmatrix} \quad (47)$$

Then, we can solve the $k^{th}$ block problem, assuming the off diagonal blocks are fixed, in a distributed fashion for k=, ..., K. That is, ignoring other block's solutions, each of these problems can be solved locally and independently. Thereafter, we have new Xk and $Y_{kk}$ for k=1, ..., K, and $Y_{kl}$ can be then updated to $X_l^T X_k$ among the blocks. We repeat this process iteratively till the trace of the solution converges.

The physical interpretation of this decomposition process is as follows. The entire sensor network is divided into smaller clusters based on geographical location and the algorithm is applied on each cluster independently. Based on the trace errors, we update some of the estimated unknown points to anchor status and repeat the estimation algorithm with the increased anchor density. This process is repeated until all the points in the network have been accurately estimated.

In one implementation, the distributed method is carried out in the following steps:

1. Partition the anchors into a number of clusters according to their geographical positions. In our implementation, we partition the entire sensor area into a number of equal sized squares and those anchors in a same square form a regional cluster.

2. Each (unpositioned) sensor sees if it has a direct connection to an anchor (within the communication range to an anchor). If it does, it becomes an unknown sensor point in the cluster to which the anchor belongs. Note that a sensor may be assigned into multiple clusters and some sensors are not assigned into any cluster.

3. For each cluster of anchors and unknown sensors, formulate the error minimization problem for that cluster, and solve the resulting SDP model if the number of anchors is more than 2. Typically, each cluster has less than 100 sensors and the model can be solved efficiently.

4. After solving each SDP model, check the individual trace (24) for each unknown sensor in the model. If it is below a predetermined small tolerance, label the sensor as positioned and its estimation $\bar{x}_j$ becomes an "anchor". If a sensor is assigned in multiple clusters, we choose the $\bar{x}_j$ that has the smallest individual trace. This is done so as to choose the best estimation of the particular sensor from the estimations provided by solving the different clusters.

5. Consider positioned sensors as anchors and return to Step 1 to start the next round of estimation.

Note that the solution of the SDP problem in each cluster can be carried out at the cluster level so that the computation is highly distributive. The only information that needs to be passed among the neighboring clusters is which of the unknown sensors become positioned after a round of SDP solutions.

In solving the SDP model for each cluster, even if the number of sensors is below 100, the total number of constraints could be in the range of thousands. However, many of those "bounding away" constraints, i.e., the constraints between two remote points, are inactive or redundant at the optimal solution. Therefore, we adapt an iterative active constraint generation method. First, we solve the problem including only partial equality constraints and completely ignoring the bounding-away inequality constraints to obtain a solution. Secondly we verify the equality and inequality constraints and add those violated at the current solution into the model, and then resolve it with a "warm-start" solution. We can repeat this process until all of the constraints are satisfied. Typically, only about $O(n+m)$ constraints are active at the final solution so that the total number of constraints in the model can be controlled at $O(n+m)$.

The above clustering approach assumes that the anchor nodes are more or less uniformly distributed over the entire space. So by dividing the entire space into smaller sized square clusters, the number of anchors in each cluster is also more or less the same. So each cluster may be solved for about the same time during each iteration. Then the estimation may be updated at the same time. There can be many other approaches in dividing the sensor network.

When the sensors in a network are not distributed uniformly, dividing the entire space into small clusters with equal area may not be the best approach. In one alternative, rather than divide the network according to the physical location, the cluster may be defined according to the number of anchors and sensors. The network is divided into clusters, such that each cluster may have substantially the same number of anchors and unknown sensors. This way, the computation load for each cluster is substantially the same. Furthermore, regardless the size of the sensor network, keep each cluster with substantially same number of known sensors and same number of unknown sensors such that the solution for each cluster is most efficient on a particular computer. The number of known sensors in a cluster is preferably about 2-10, and the number of unknown sensors is 20-100 in one of the implementation.

If there are not enough known sensors in a particular region, the unknown sensors may be grouped into one or more clusters and the solution of these clusters may be delayed, until some unknown sensors become "known" due to the solution of the neighboring regions.

Another approach would be to create clusters more intelligently based on local connectivity information. Keeping this in mind, we try and find for each sensor its immediate neighborhood, that is, points within radio range of it. It can be said that such points are within one hop of each other. Higher degrees of connectivity between different points can also be evaluated by calculating the minimum number of hops between the 2 points. Using the hop information, we propose to construct clusters which are not necessarily of any particular geometric configuration but are defined by its connectivity with neighborhood points. Such clusters would yield much more efficient SDP models and faster and more accurate estimations.

The distributed SDP approach solves with great accuracy and speed very large estimation problems which would otherwise be extremely time consuming in a centralized approach. Also due to smaller independent clusters, the noise or error propagation is quite limited as opposed to centralized algorithms. In fact, the trace error (23) provides us with a very reliable measure of how accurate the estimation is and can be used to discard estimations which may be very inaccurate as well as determining good estimations which may be used in future estimations. This distributed algorithm is particularly relevant in the ad hoc network, a scenario where so much emphasis is given to decentralized computation schemes.

When a very large sensor network is deployed, more than one control stations may be used in the network. The control stations may all located in the central office and perform the calculation for a few clusters of the network. More efficiently, some of the control stations are deployed in the field together with some anchors. When the control stations are deployed in the field, the data regarding the anchors or sensors within the neighborhood clusters do not need to be communicated to the central office, thus greatly reduces the network traffic. Most of the communication is localized towards the local control station. Only the information of the anchors or sensors near the border area between clusters needs to be communicated to other control stations responsible for those neighboring clusters. And then only the final solution of the unknown sensors positions within the clusters needs to be communicated to other control stations or the control station in the central office.

The current invention is further illustrated using several examples of implementation and their results in solving sensor network localization problems. These examples are for illustrative purpose. They are not used to limit the scope of the current invention. The current invention may be applied in many different localization problems. For example, the network may have irregular shape; the anchors or sensors may be distributed unevenly; the sensors in the network may not be within the same plane surface. For simplicity of illustration, all networks are located in a square surface and sensors are randomly and more or less uniformly distributed in the square surface. Anchors (i.e. known sensors) are denoted as diamonds; unknown sensors are denoted with circles; and the estimated positions of unknown sensors are denoted with asterisks. A line connects an actual position and an estimated position to illustrate the error and the size of the error.

Examples of SDP Implementation

Simulations were performed on a network of 50 sensors or nodes randomly placed in a square region of size 1×1 centered at the origin. The distances between the nodes was calculated. If the distance between 2 nodes was less than a given radiorange between [0, 1], a random error was added to it $$\bar{d}_{ij} = d_{ij} \cdot (1 + randn(1) \cdot noisyfactor), \quad (48)$$

where noisyfactor was a given number between [0,1] and randn(1) was a standard normal random variable. If the distance was beyond the given radiorange, only the lower bound constraint, $\geq$radiorange, was applied if necessary. The selection of the lower bounding constraint was based on an iterative active-constraint generation technique. Because most of these "bounding away" constraints, i.e., the constraints between two remote nodes, would be inactive or redundant at an optimal solution, very few of these constraints were needed in computation.

The average estimation error and average trace were defined by $$\frac{1}{n} \cdot \sum_{j=1}^{n} \|\bar{x}_j - a_j\| \tag{49}$$

$$\text{and } \frac{1}{n} \cdot \text{Trace}(\bar{Y} - \bar{X}^T \bar{X}) \tag{50}$$

respectively, where $\bar{x}_j$ comes from the SDP solution and $a_j$ is the true position of the jth node. Connectivity indicates how many of the nodes, on average, are within the radio range of a node.

Also the original and the estimated sensors were plotted. The diamond nodes refer to the positions of the anchors; circle nodes to the original locations, A, of the unknown sensors; and asterisk nodes to their estimated positions from $\bar{X}$. The discrepancies in the positions can be estimated by the offsets between the original and the estimated points as indicated by the solid lines, i.e. the length of the line indicates the size of estimation error.

Figure 1A:
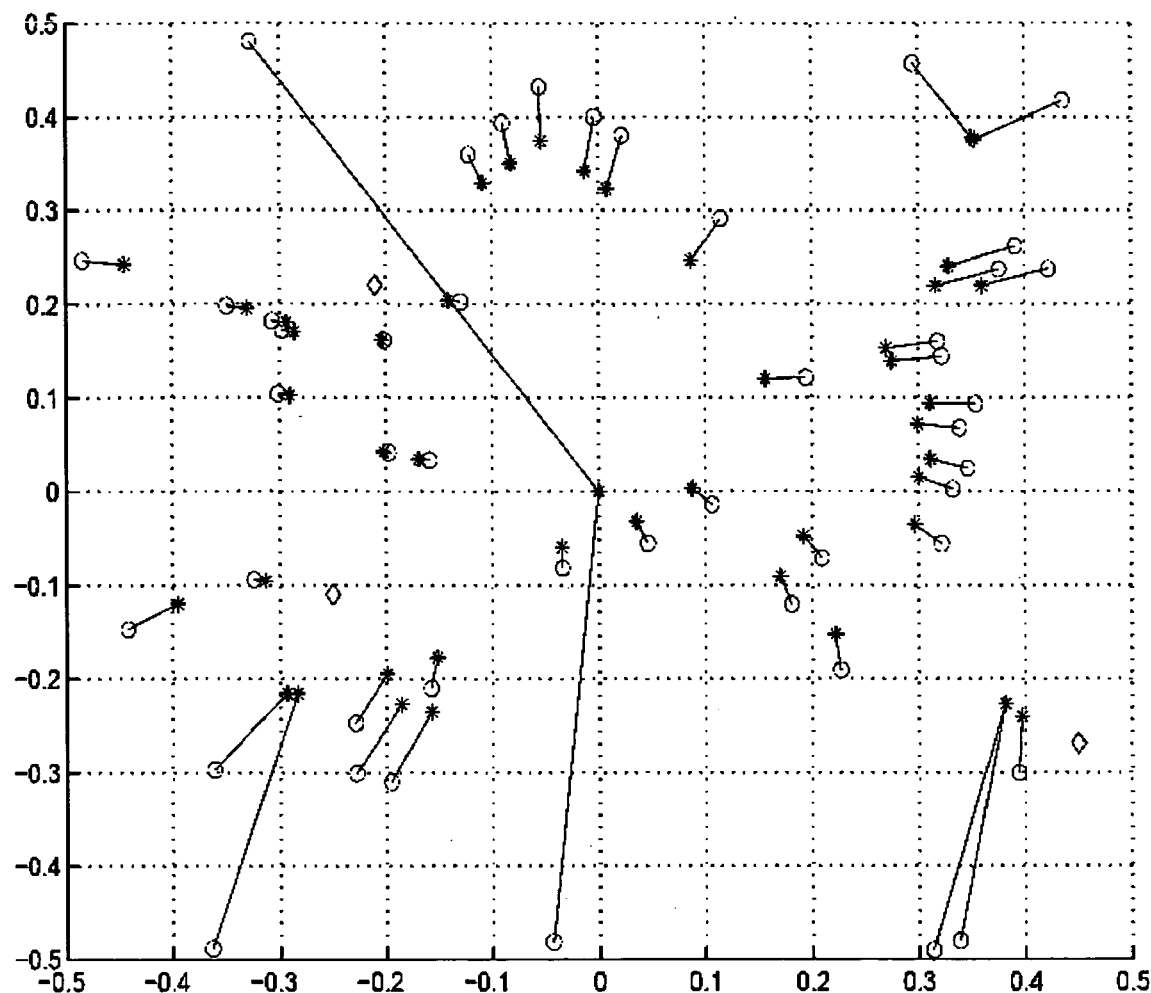
FIGS. 1a, 1b and 1c depict solutions to three-anchor network problems according to an embodiment of the present invention.
Figure 1B:
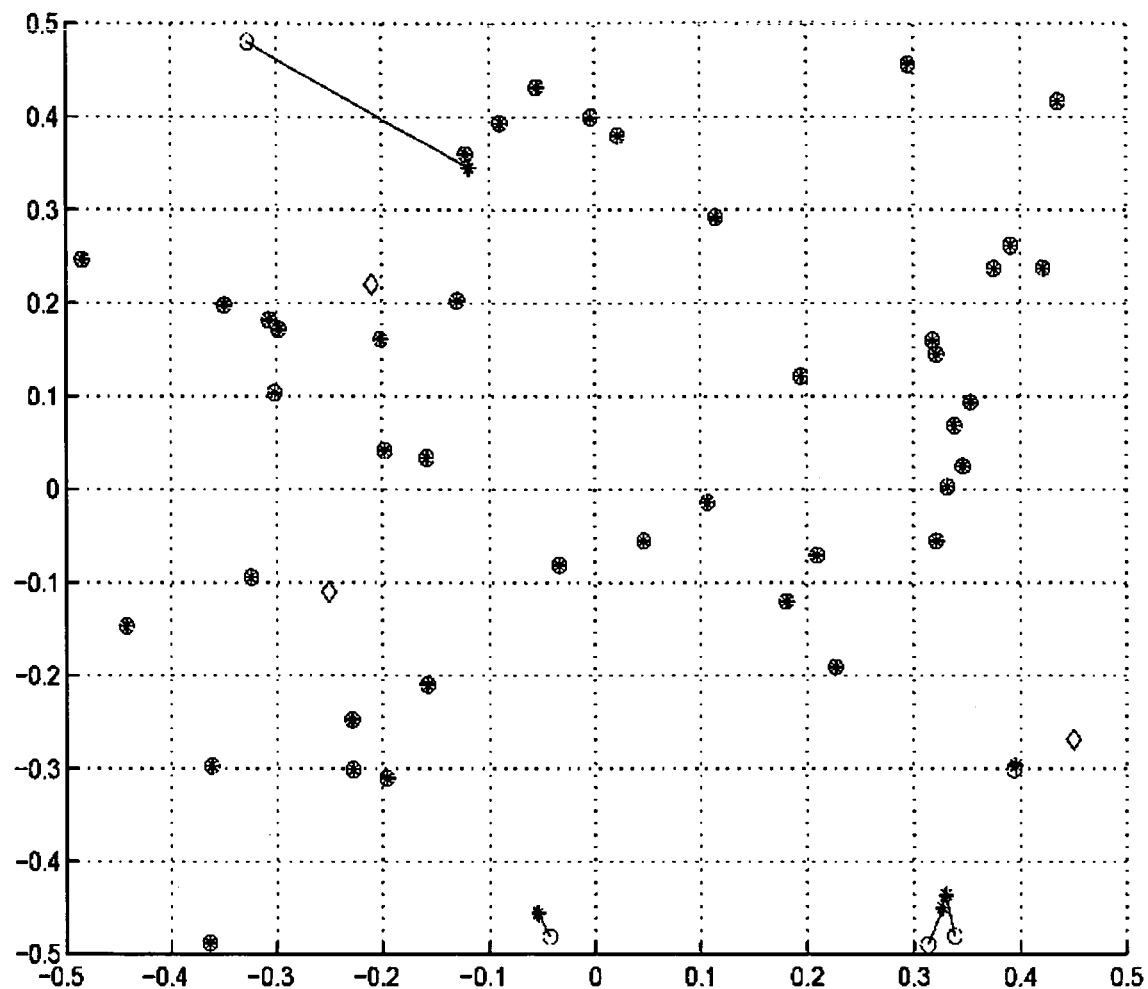
Figure 1C:
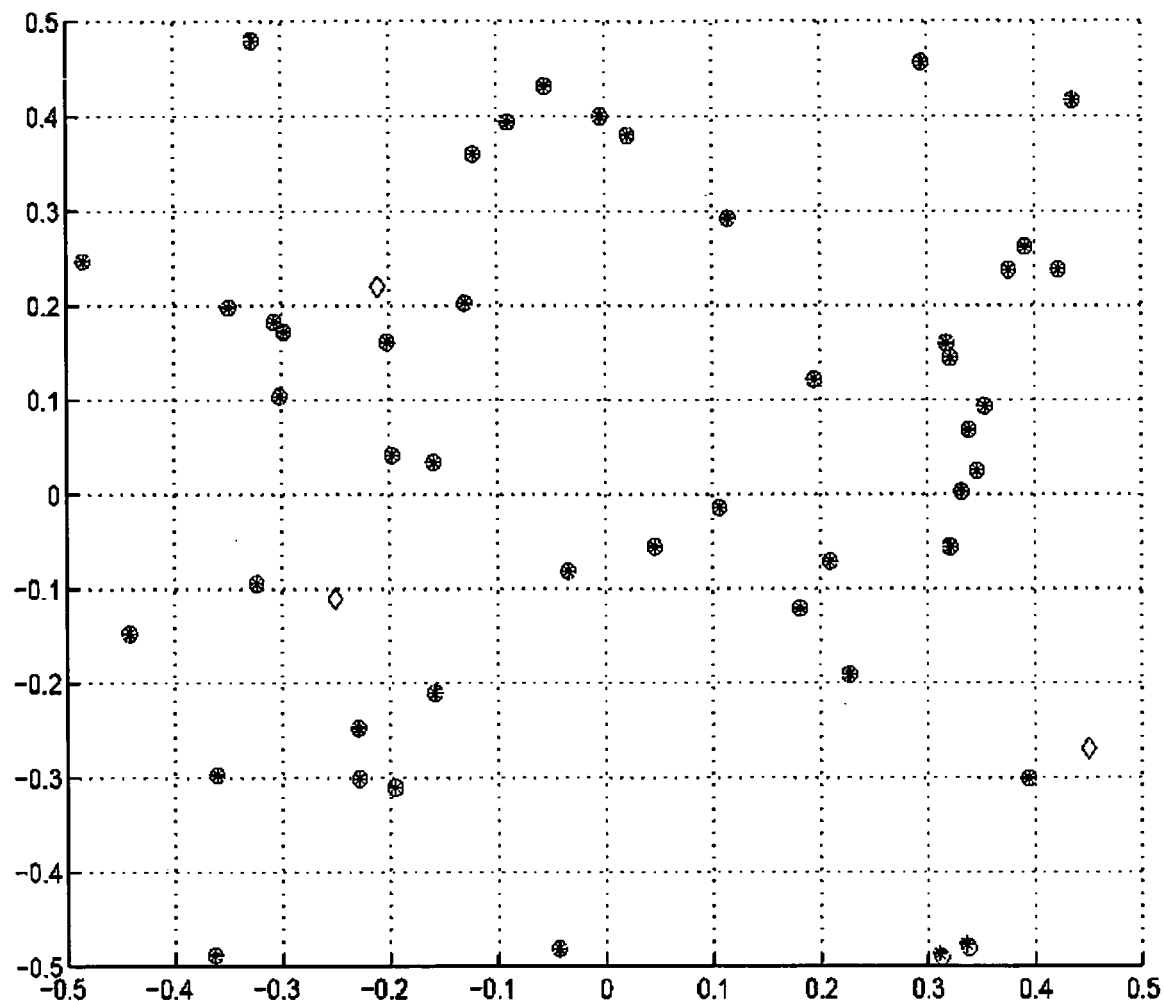
Figure 2A:
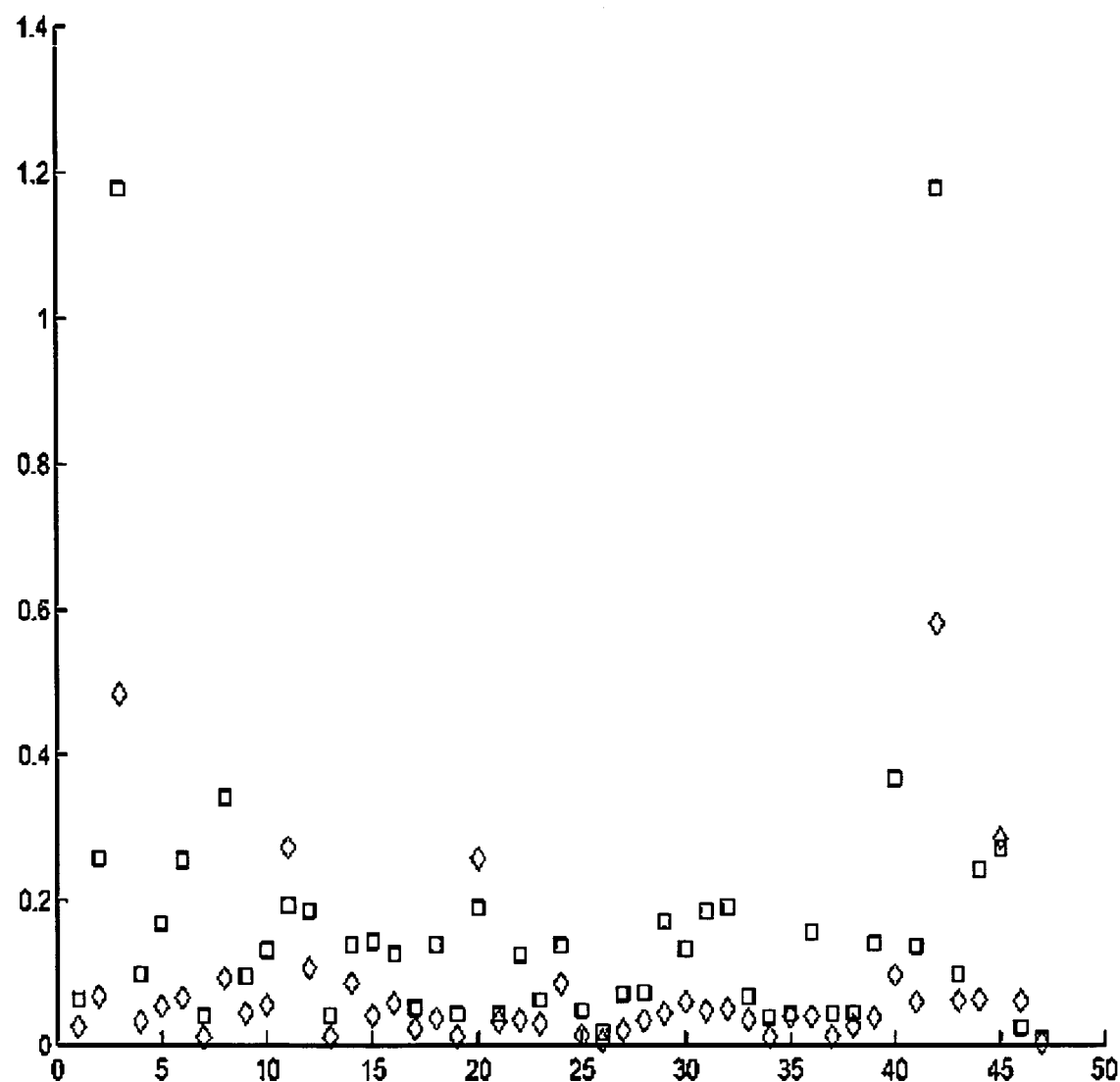
FIGS. 2a and 2b depict the comparisons of estimated errors and actual errors in the solution of FIGS. 1a and 1b.
Figure 2B:
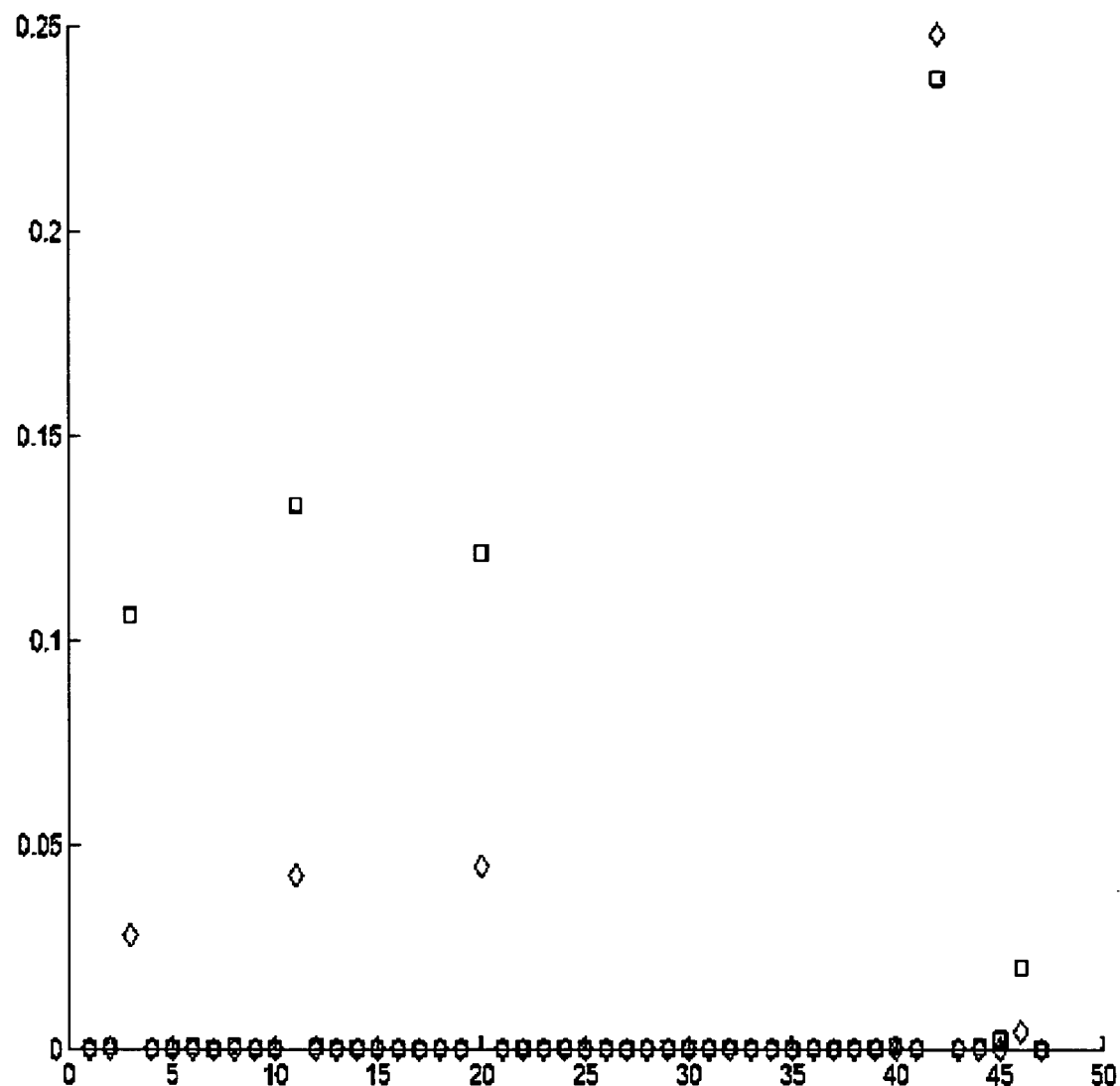

The effect of variable radio ranges and as a result, connectivity, was observed in FIGS. 1a, 1b and 1c. The radio range was varied from 0.2 to 0.35. FIG. 1a shows a solution when the error is 0.08; connectivity is 5.8; average trace is 0.09 and radio range: is 0.20. FIG. 1b shows a solution when the relevant parameters are: error 0.075, connectivity 7.8, average trace 0.0021 and radio range 0.25. FIG. 1c shows a solution when the relevant parameters are: error 0.00018, connectivity 10.5, average trace 0.000043 and radio range 0.30. In FIG. 1b, for the four sensors with large error estimation, their individual traces made up most of the total traces, which match where the real errors are accurately. FIGS. 2a and 2b show the correlation between individual error and trace for each unknown sensor for cases in FIG. 1a and FIG. 1b. In FIGS. 2a and 2b, the diamonds are the actual error and the squares are the estimated error. For most sensors, the estimated errors are larger than the actual error, which means that the estimated errors are conservative.

Figure 3A:
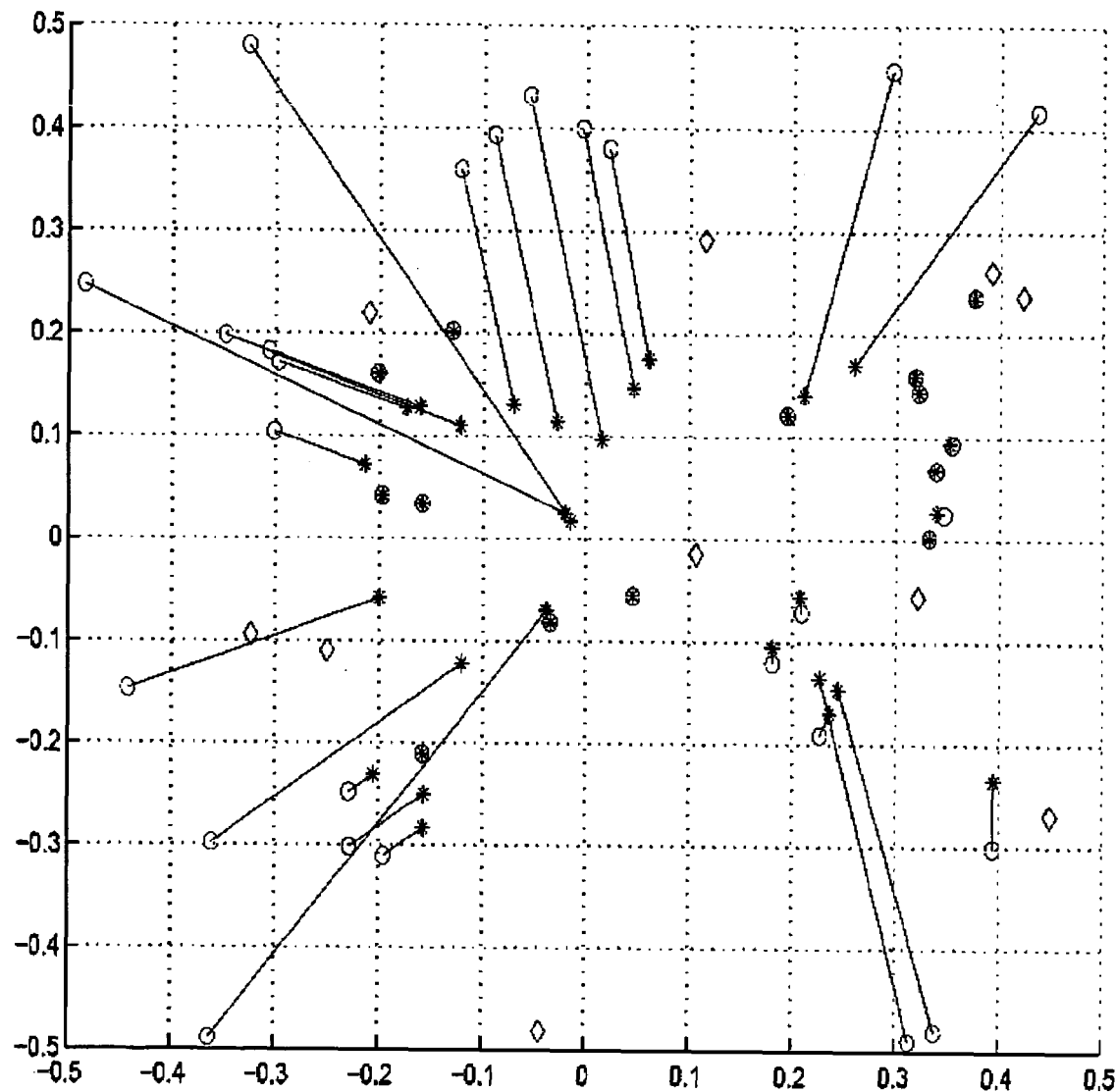
FIGS. 3a and 3b are solutions using one prior art method for the same problem as shown in FIG. 1c.
Figure 3B:
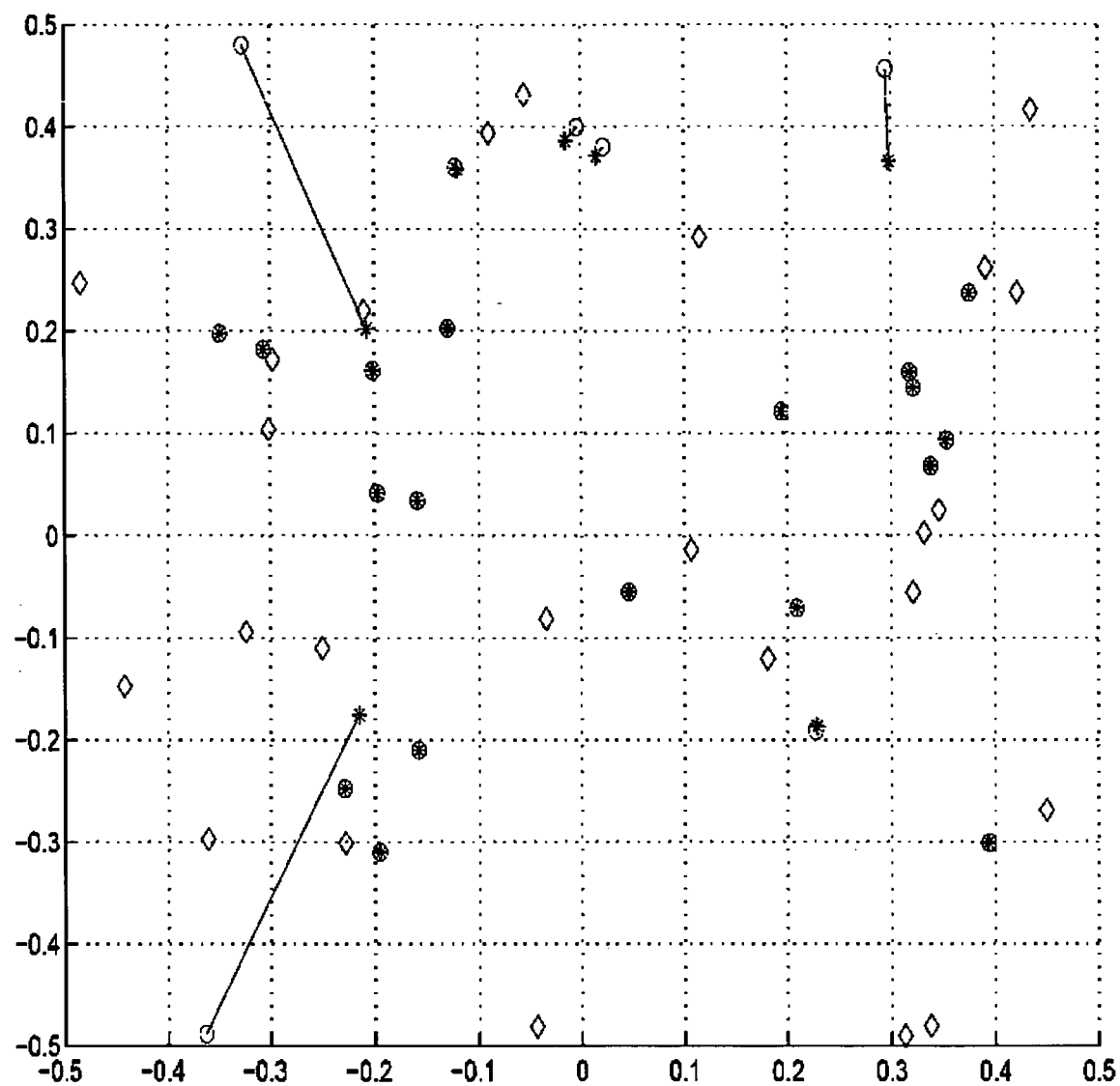

In comparison, for the same case FIG. 1c, we computed the results from the Doherty et al. method with the number of anchors 10 and 25, and depicted their pictures in FIGS. 3a and 3b. The radio range is 0.30 and noisy factor is set at 0. As we expected, the estimated positions were all in the convex hull of the anchors.

Figure 4A:
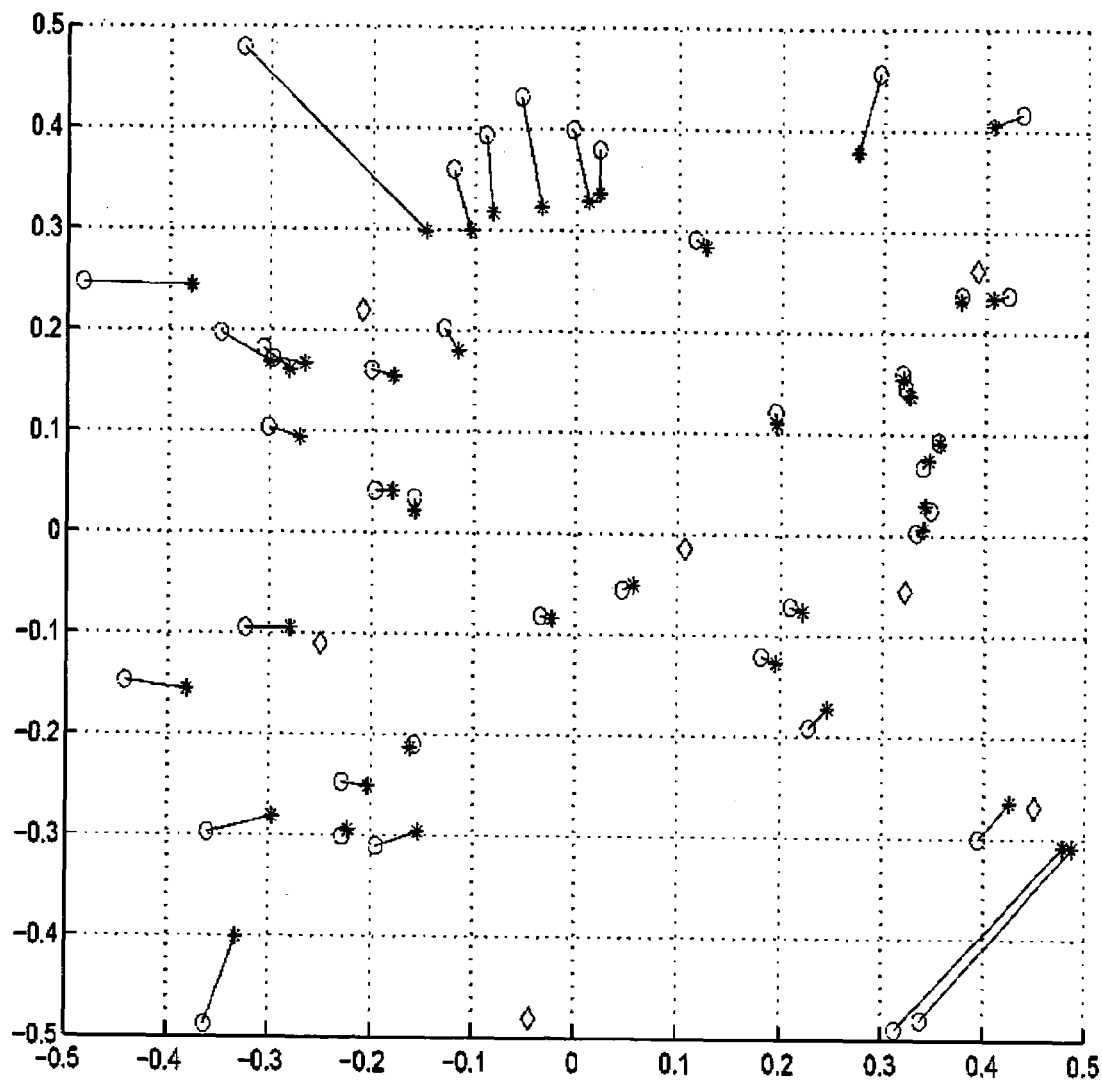
FIGS. 4a, 4b, 5a and 5b illustrate solutions in various conditions.
Figure 4B:
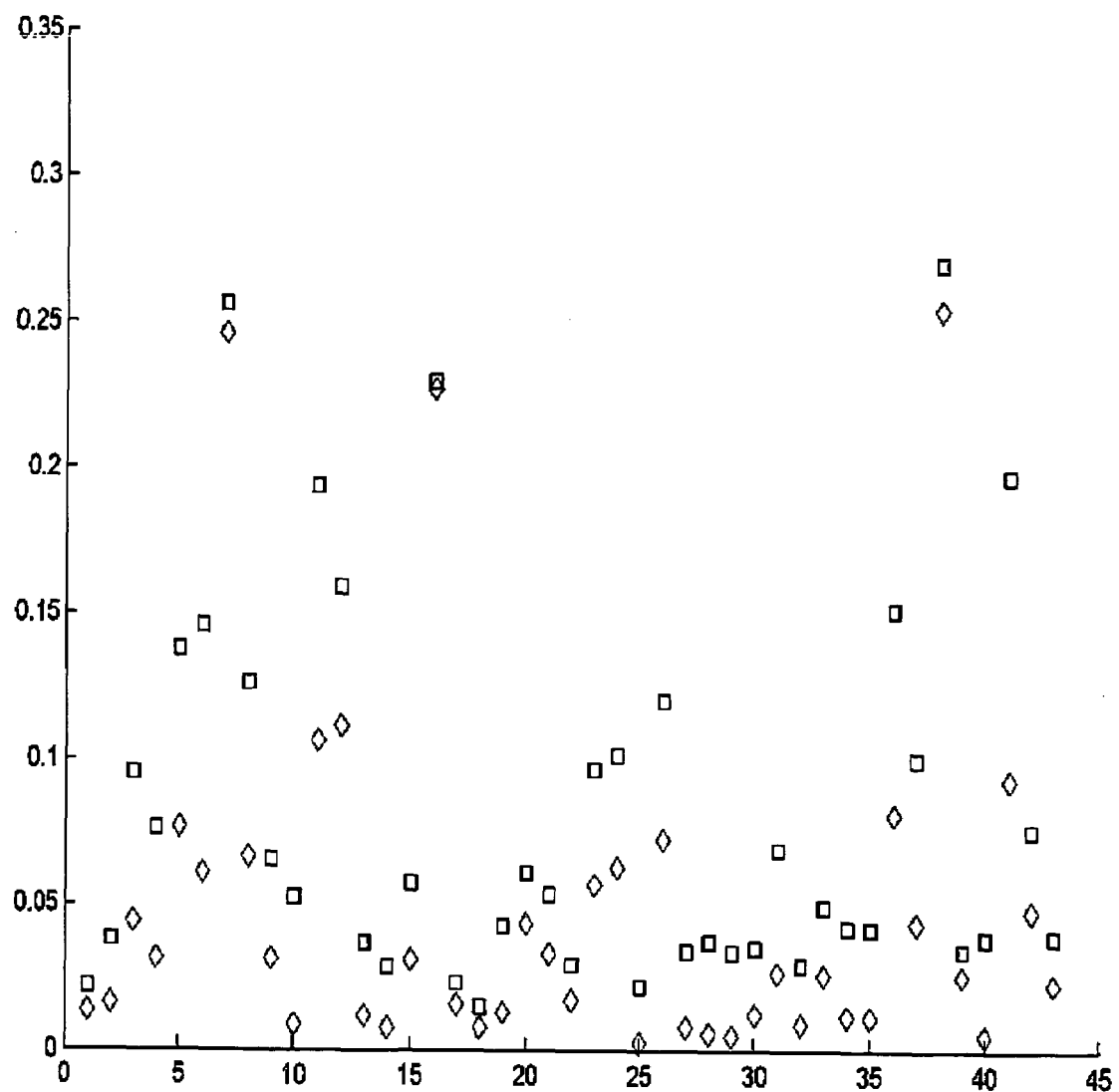

FIGS. 4a, 4b, 5a and 5b illustrate the situation where the distance information has measurement errors or other errors. We set the noisyfactor to 0.05 and radio range to 0.3, we increase the anchors to 7, and their pictures are illustrated in FIGS. 4a and 4b. Here, each of the distance data has up to 5% error, either plus or minus. Again, one can see the erroneous estimations are reflected in their individual traces. FIG. 4a depicts the solution and FIG. 4b depicts the error estimation for each sensor position estimation. The relevant parameters for FIG. 4a are error 0.054, average trace 0.014, anchor number 7, radio range 0.3 and noisy factor 0.05.

Figure 5A:
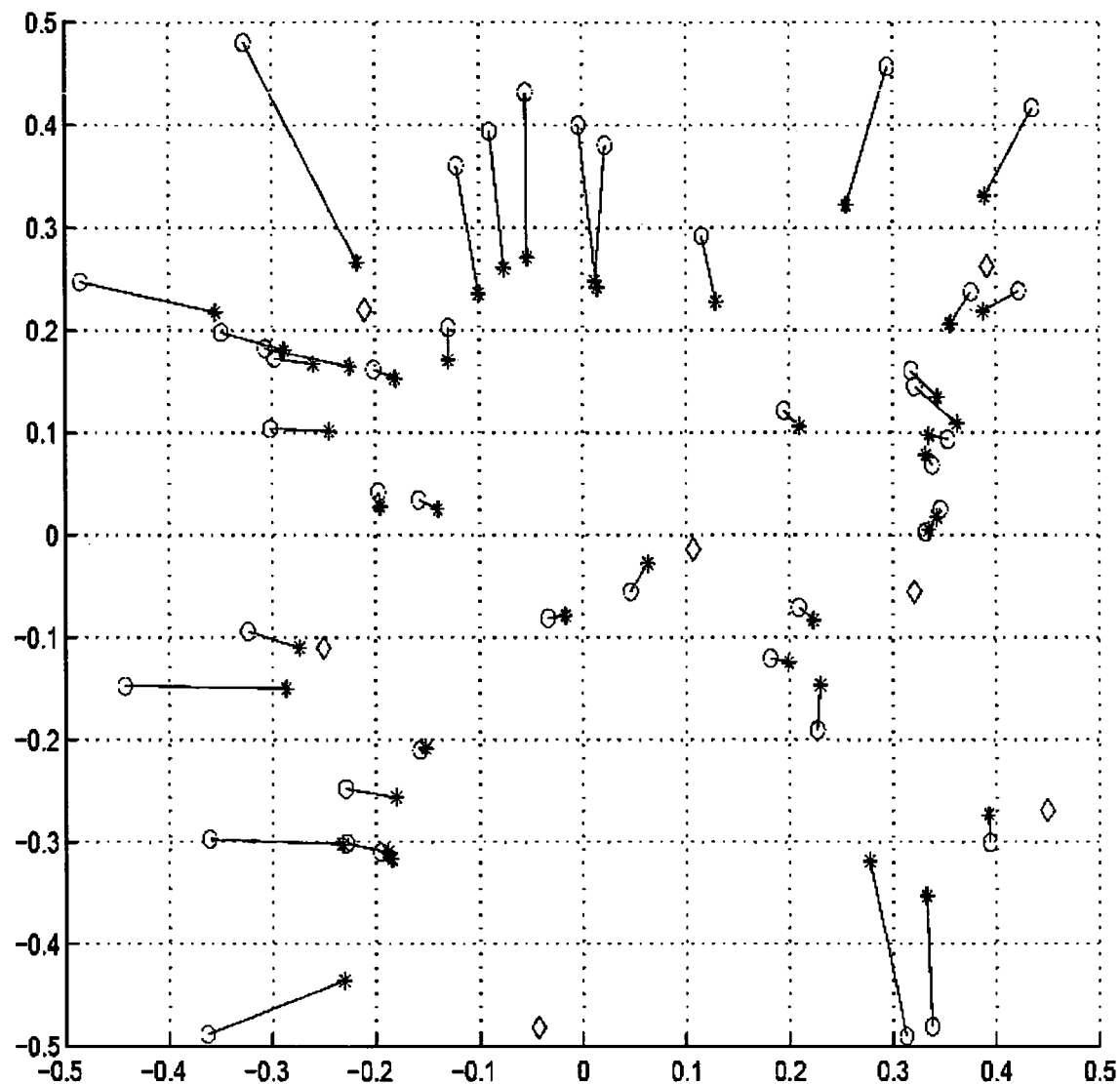
Figure 5B:
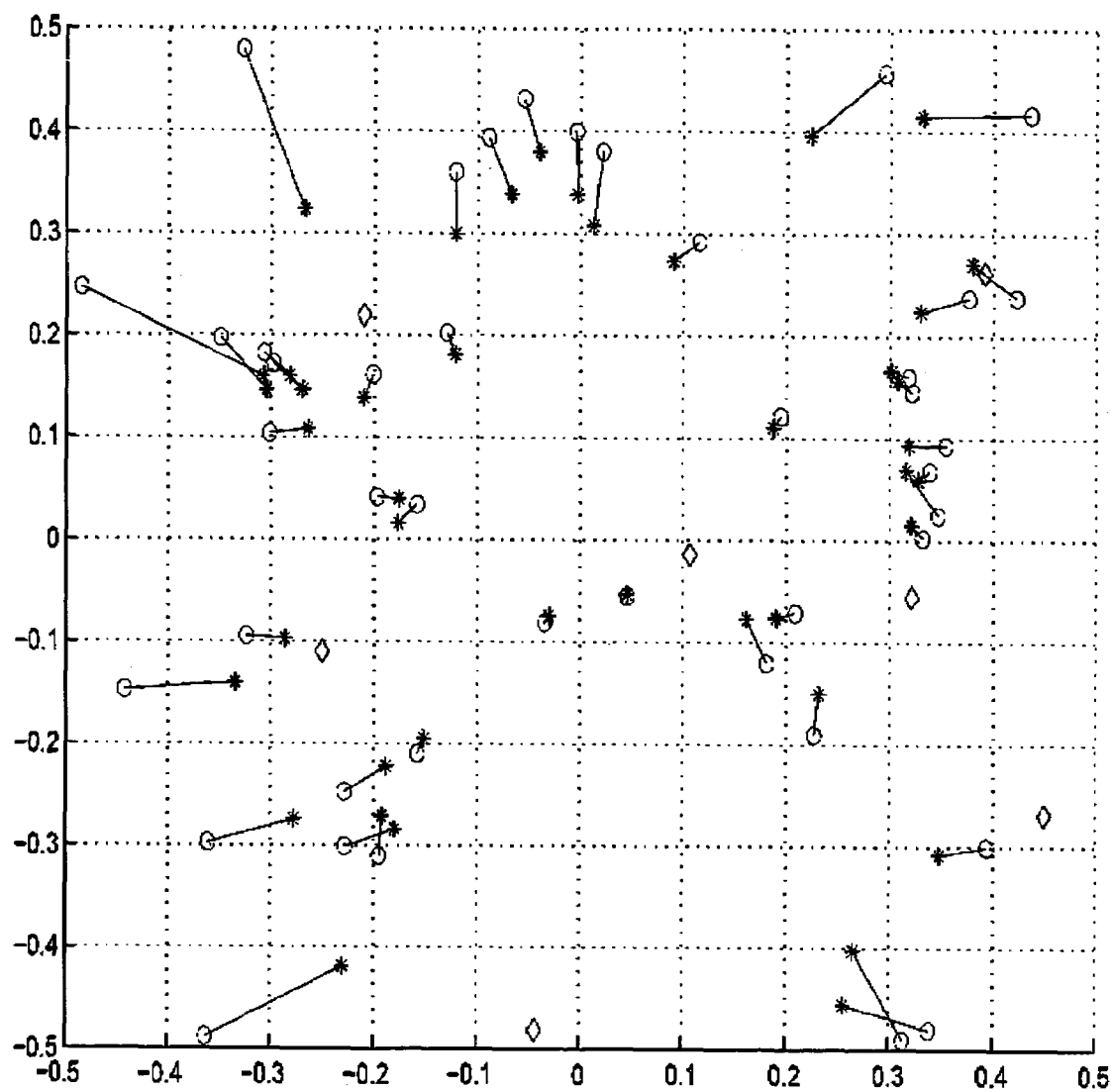

Then, we increase noisyfactor to 0.10 (that is, each of the distance data has up to 10% error either plus or minus). The result is shown in FIGS. 5a and 5b. The relevant parameters for FIG. 5a are error 0.064, average trace 0.012, radio range 0.30, anchor number 7 and noisy factor 0.10. As shown in FIG. 5a, even with 10% error measurement, the position estimation for the sensors near anchor nodes is still fairly accurate. FIG. 5b shows the estimated error in each position estimation shown in FIG. 5a.

The computational results presented here were generated using the interior-point algorithm SDP solvers SeDuMi and DSDP2.0 with their interfaces to Matlab. The average time to solve one of the 50 sensor problem is 8 seconds by SeDuMi (with the primal formulation) or 2 seconds by DSDP2.0 on a Pentium 1.2 GHz and 500 MB PC. DSDP is faster due to the fact that the data structure of the problem is more suitable for DSDP.

Example of Distributed Method.

Simulations of distributed method were performed in a similar way as the SD was done. Simulations were performed on networks of 2,000 to 4,000 sensor points which are randomly generated in a square region of [−0.5 0.5]×[−0.5 0.5] using rand(2,n)−0.5 in MATLAB. The distance between two points is calculated as follows: If the distance is less than a given radiorange between [0.1], a random error was added to it See equation (48). If the distance is beyond the given radiorange, no distance information is known to the algorithm except that it is greater than radiorange. We generally select the first 10% of the points as anchors, that is, anchors are also uniformly distributed in the same random manner. The tolerance for labeling a sensor as positioned is set at 0.01·(1+ noisyfactor)·radiorange.

Also the original true and the estimated sensor positions are plotted. Due to the large number of sensors/anchors/estimated position of sensors, they will not be differentiated in the charts discussed below. But the difference between an actual sensor position and its estimated position is indicated by a straight line between the two positions, actual and estimated. The longer the line, the larger the error.

Figure 6A:
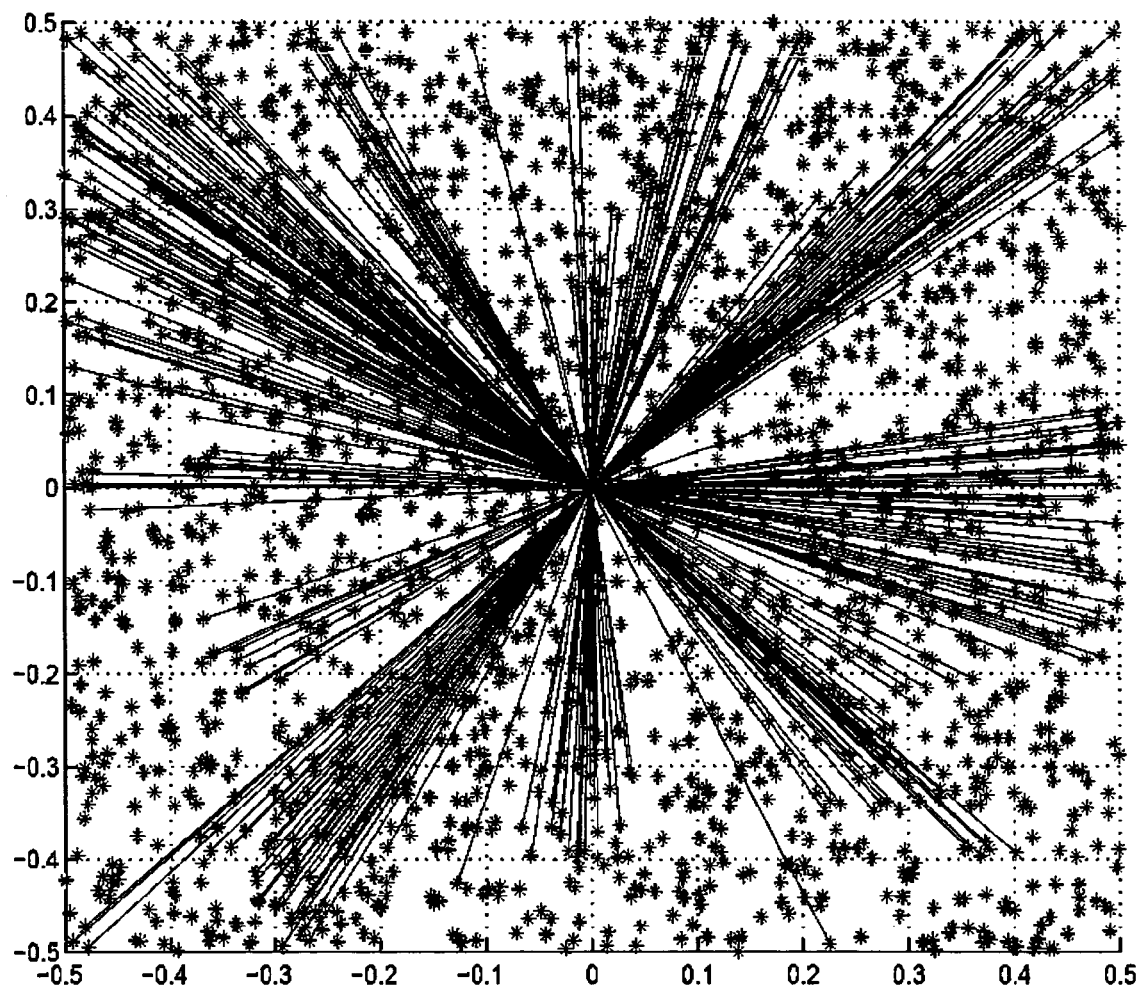
FIGS. 6a, 6b and 6c show solutions of sensor networks of 2000 sensors using a distributed method according to an embodiment of present invention.
Figure 6B:
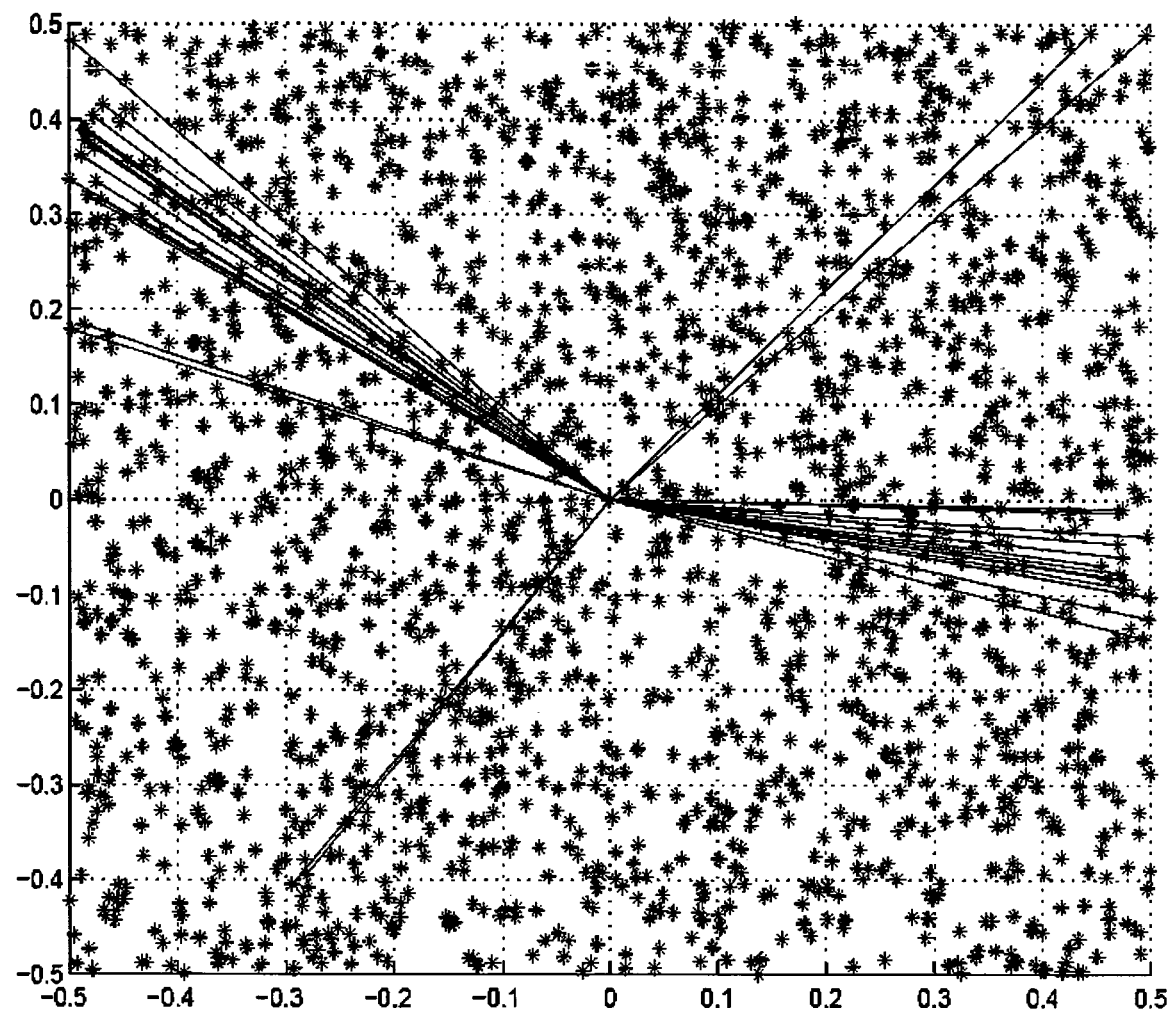
Figure 6C:
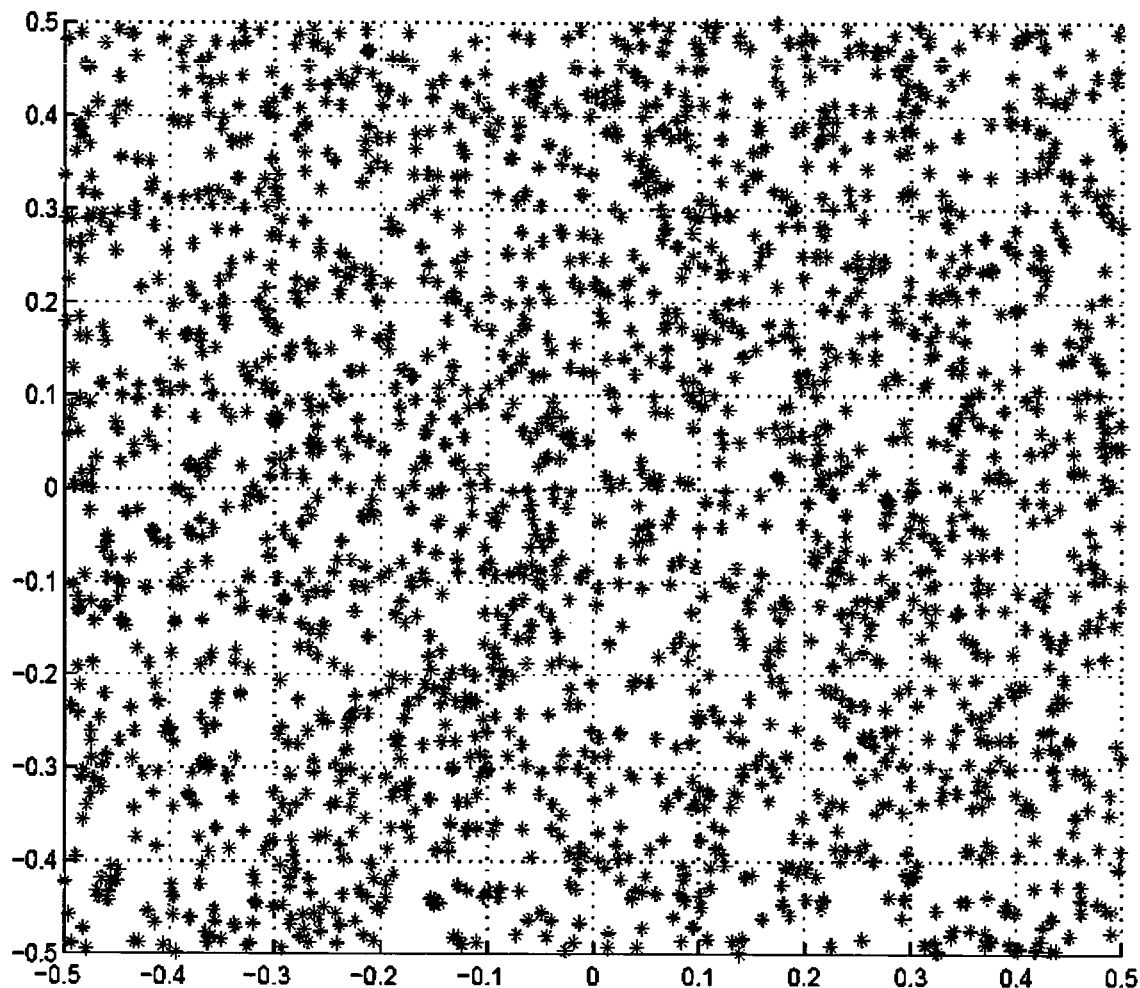

The first simulation is carried out for solving a network localization with 2,000 sensors, where the iterative distributed SDP method terminates in three rounds, see FIGS. 6a, 6b, and 6c. FIG. 6a is the result after the first round computation; FIG. 6b shows the second round result and FIG. 6c shows the third and final round result. When a sensor is not positioned, its estimation is typically at the origin. In this simulation, the entire sensor region is partitioned into 7×7 equal-sized squares, that is, 49 clusters, and the radio range is set at 0.06. The total solution time for the three round computations on a single Pentium 1.2 GHz and 500 MB PC, excluding the computation of $d_{ij}$, is about two minutes.

As can be seen from FIGS. 6a, 6b, and 6c, it is usually the outlying sensors at the boundary or the sensors which do not have many anchors within the radio range that are not estimated in the initial stages of the method. Gradually, as the number of well estimated sensors or 'ghost' anchors grows, more and more of these points are estimated.

Figure 7A:
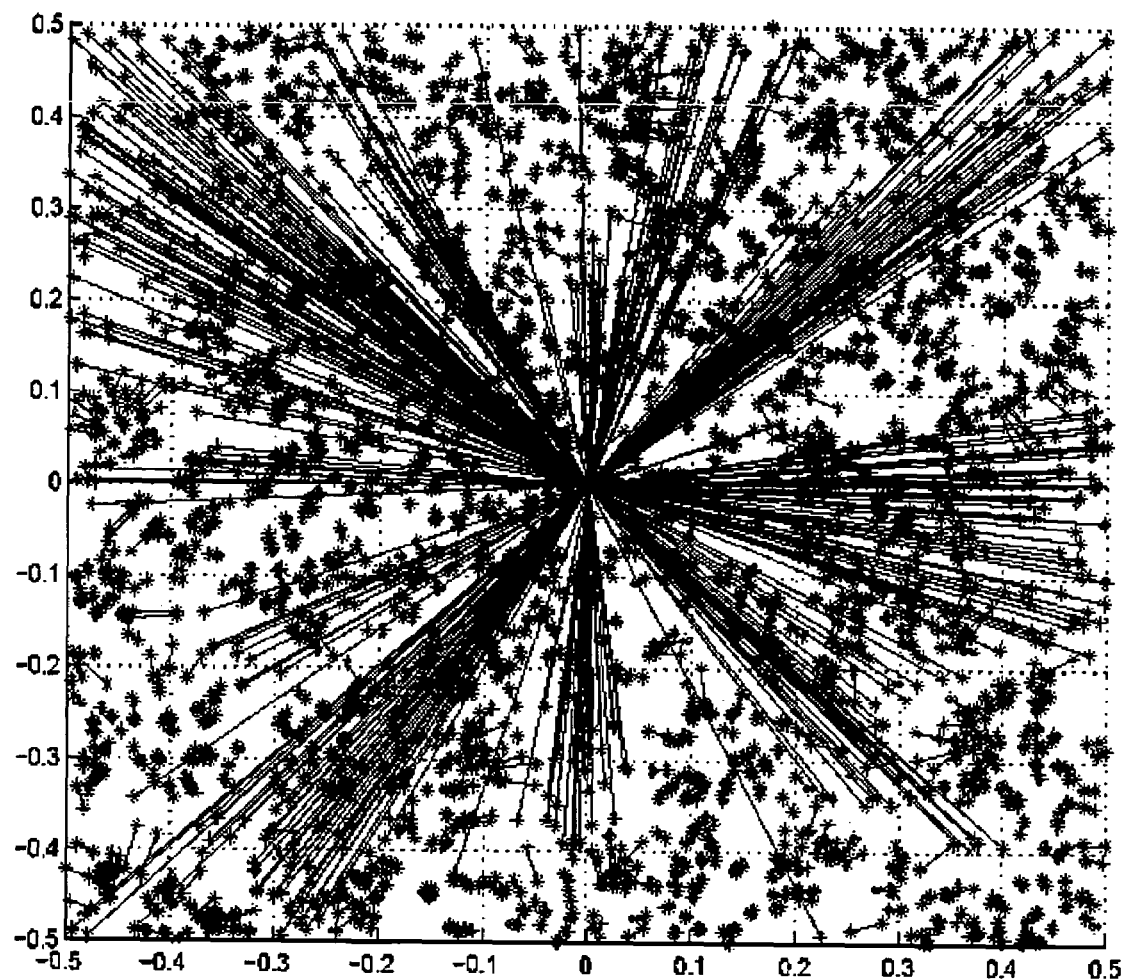
FIGS. 7a, 7b, 7c and 7d show intermediate and final solutions of a sensor network and the accuracy of the final solution, and the errors in position solutions for a few sensors with large errors.
Figure 7B:
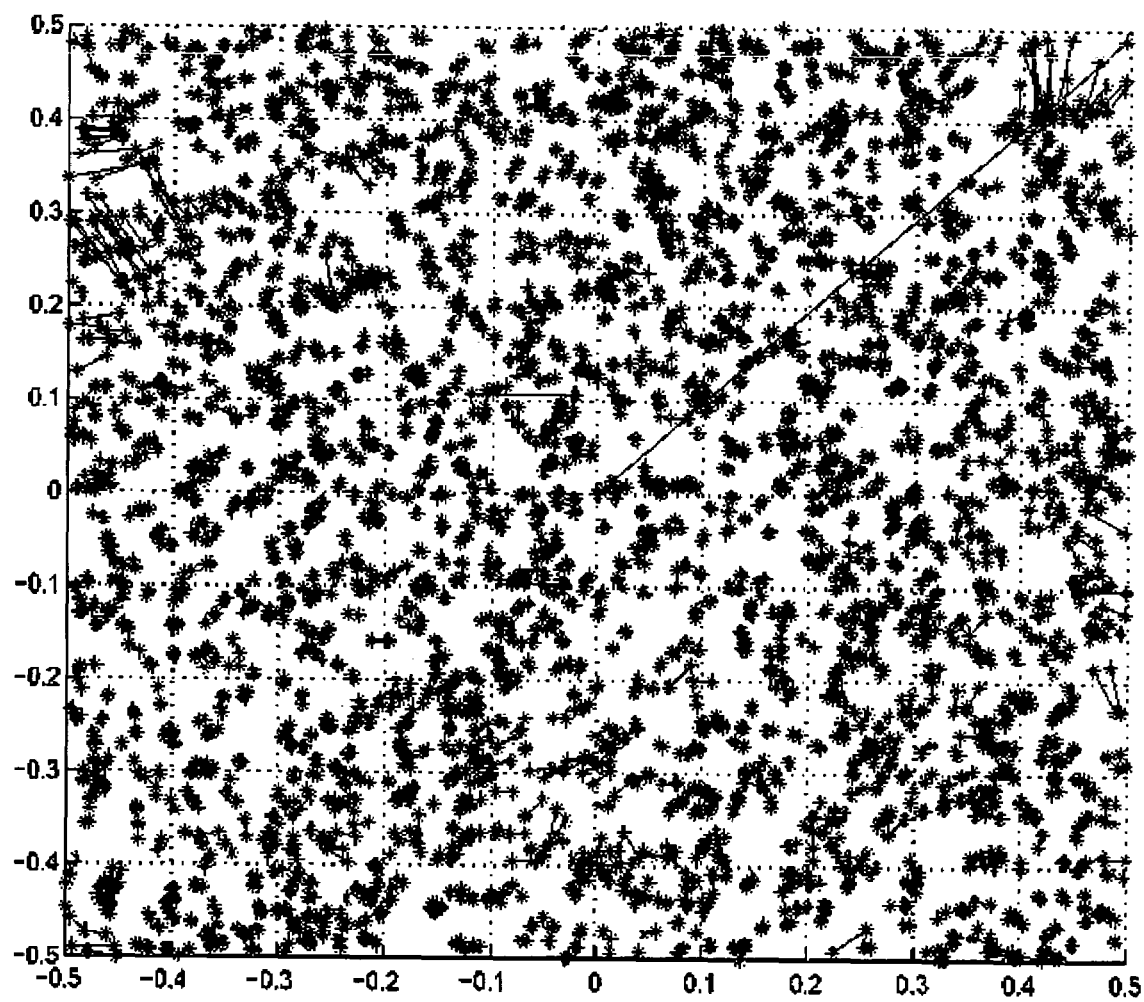

The second simulations for distributed method is for solving the same network of 2,000 sensors and 49 clusters, but the distance $d_{ij}$ is perturbed by a random noise either plus or minus, that is, $$\hat{d}_{ij} = d_{ij} \cdot (1 + randn(1) \ast 0.05), \tag{51}$$

where randn(1) is a standard normal random number. The iterative distributed SDP method terminates in thirteen rounds, see FIGS. 7a, 7b, and 7c for rounds 1, 6 and 13.

It is expected that the noisy cases will take more iterations since the number of 'ghost' anchors added at each iteration will be lower due to higher errors in estimation. The final rounds mainly refine position estimations, for a small number of sensors and each round runs in a few seconds.

Figure 7C:
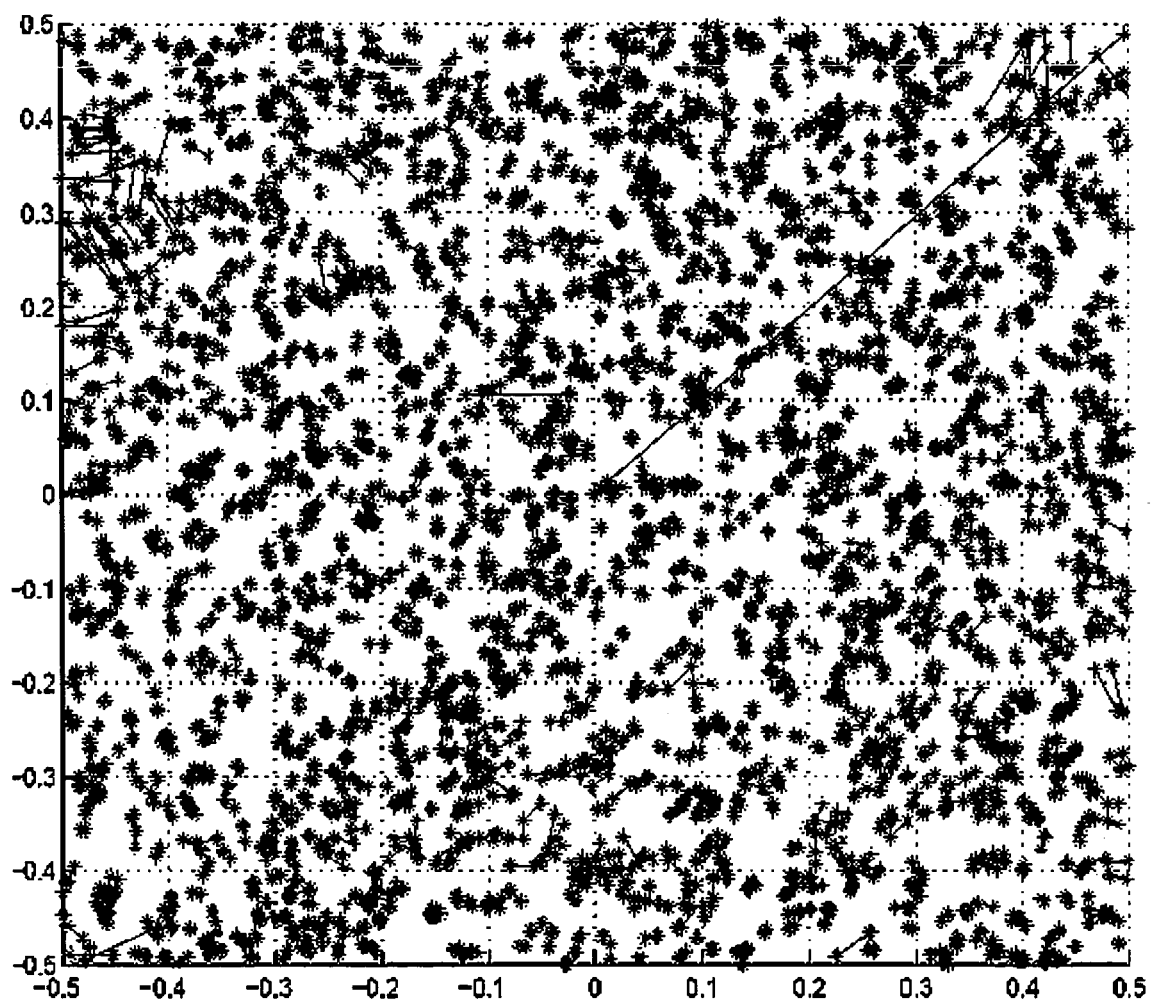
Figure 7D:
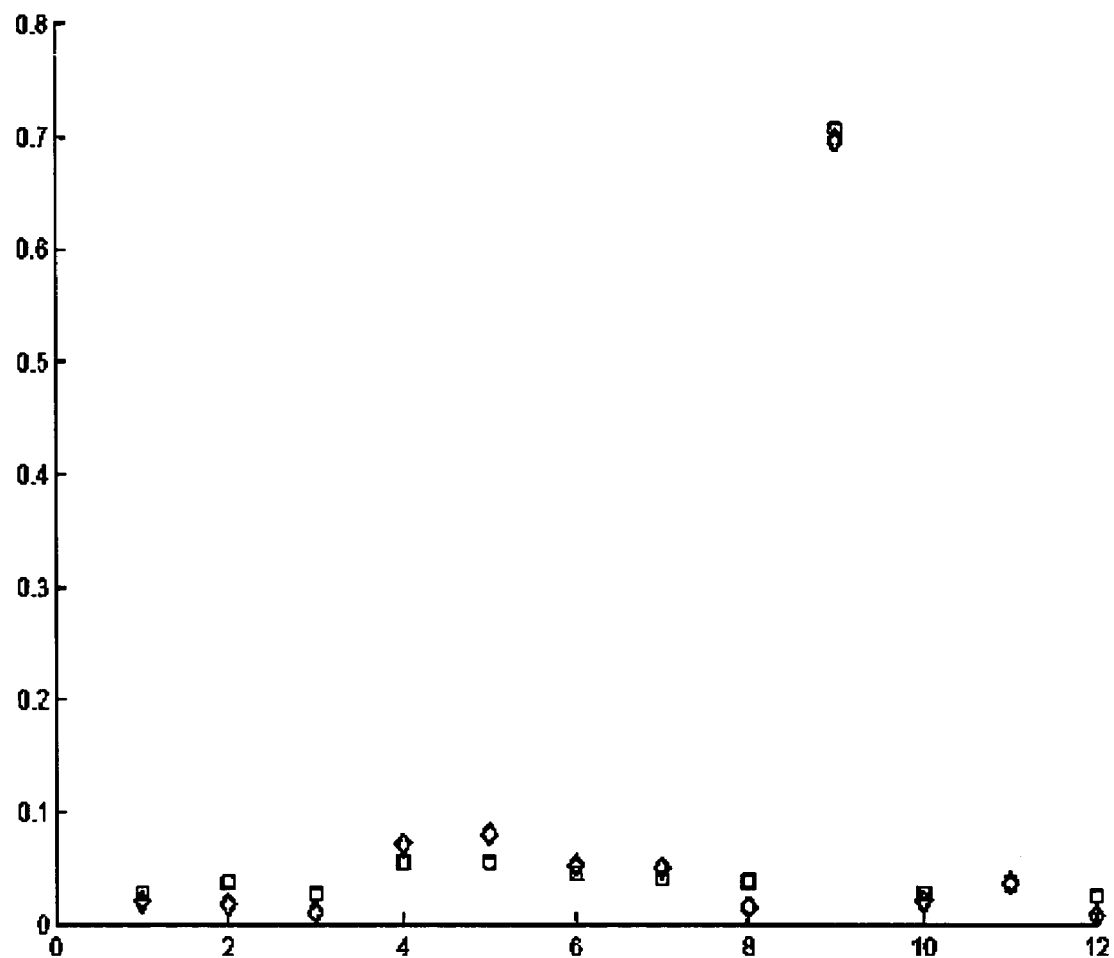

Note that the estimation from the distributed method possesses good quality and there is no propagation of noisy errors. One sensor on the very up-right corner in FIG. 7c is unconnected to the network in this noisy data so that it is un-positioned at the final solution. Its individual trace also indicates this fact in the simulation. FIG. 7d shows the correlation between actual individual error (diamond) and the square-root of trace (square) for a few sensors whose trace is higher than 0.01·(1+noisyfactor)·radiorange after the final round. This again shows that the square-root of trace is good indicator of each sensor's individual position estimation.

Figure 8A:
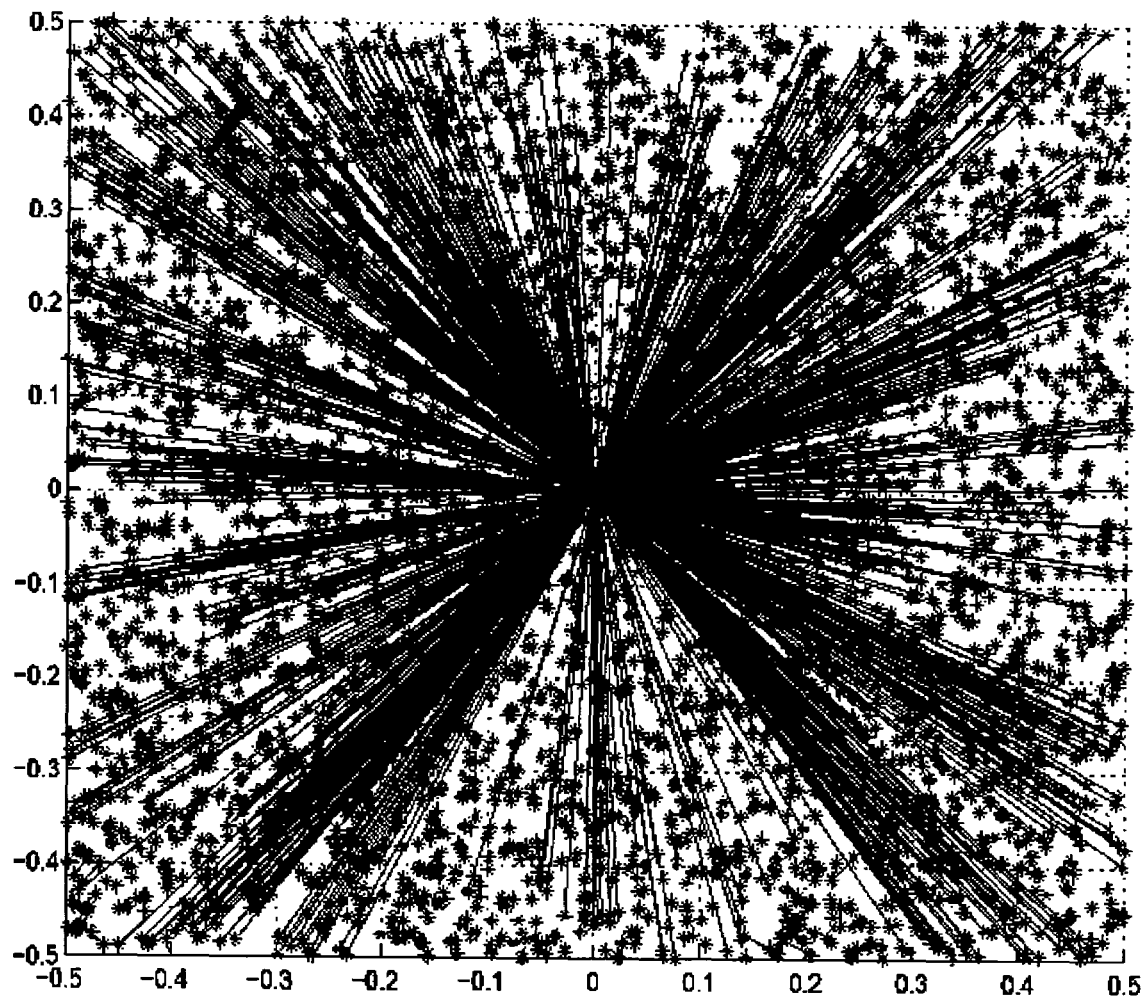
FIGS. 8a, 8b, 8c and 8d show intermediate and final solutions of a sensor network with 4000 sensors and the accuracy of the final solution.
Figure 8B:
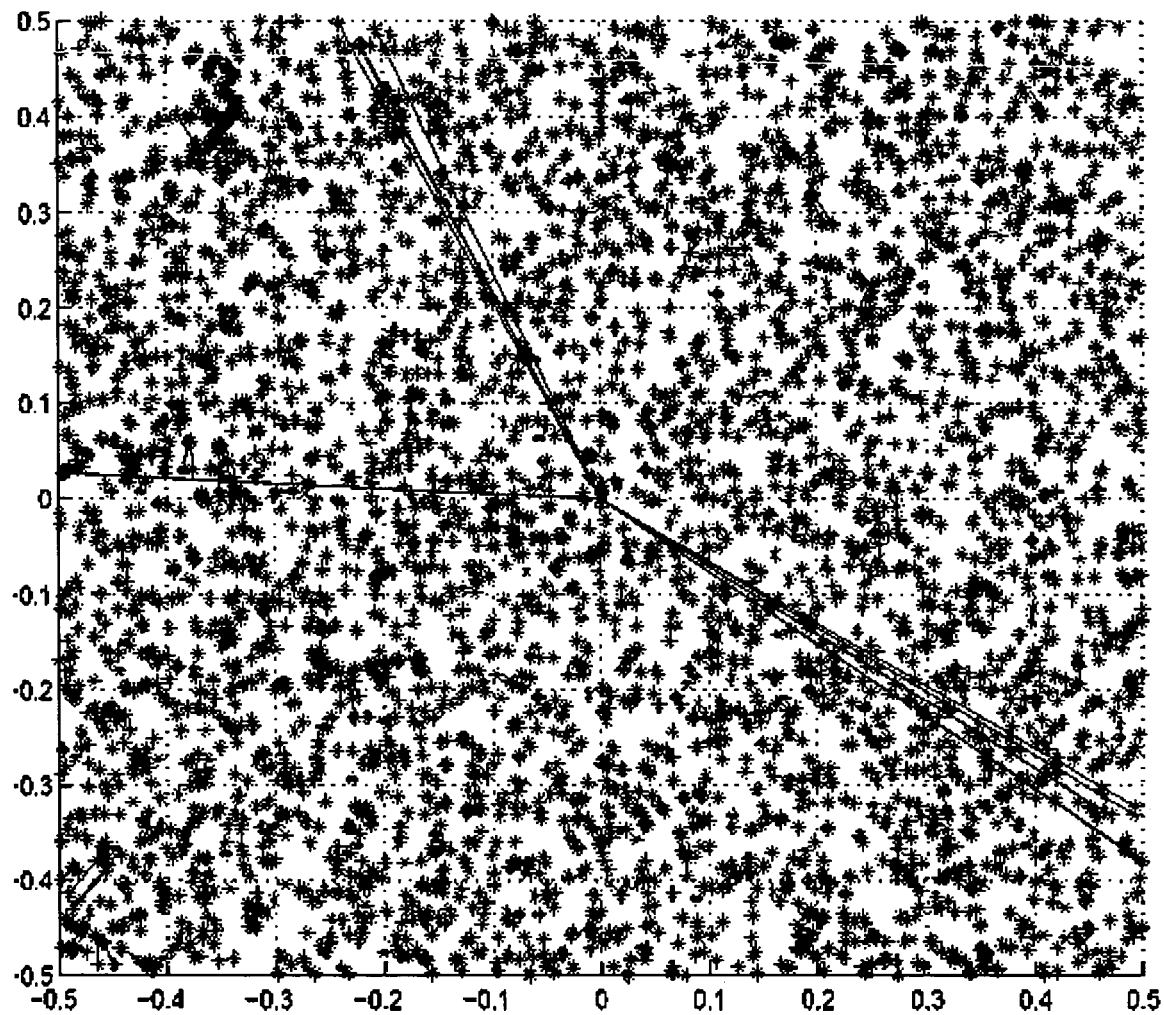
Figure 8C:
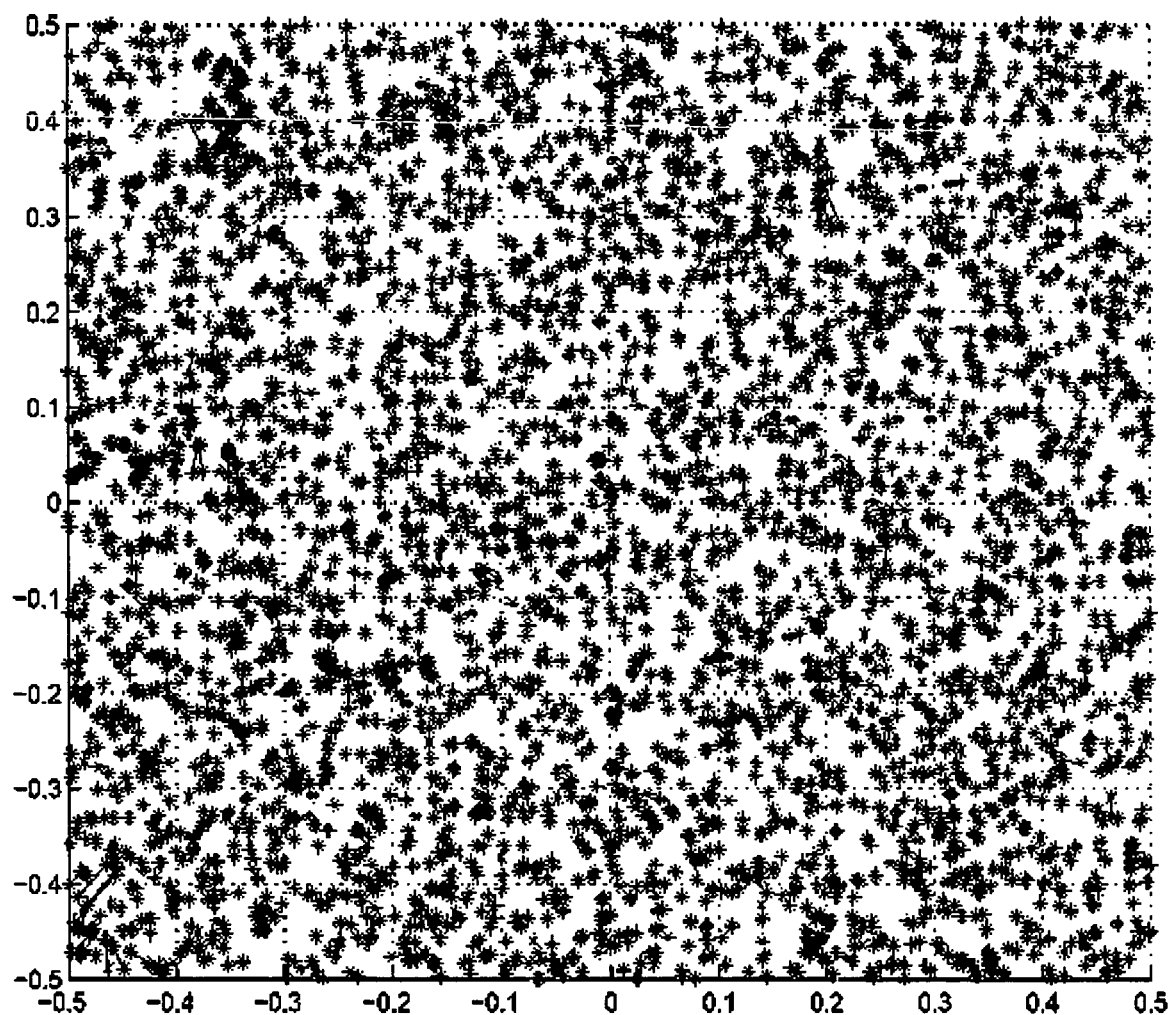
Figure 8D:
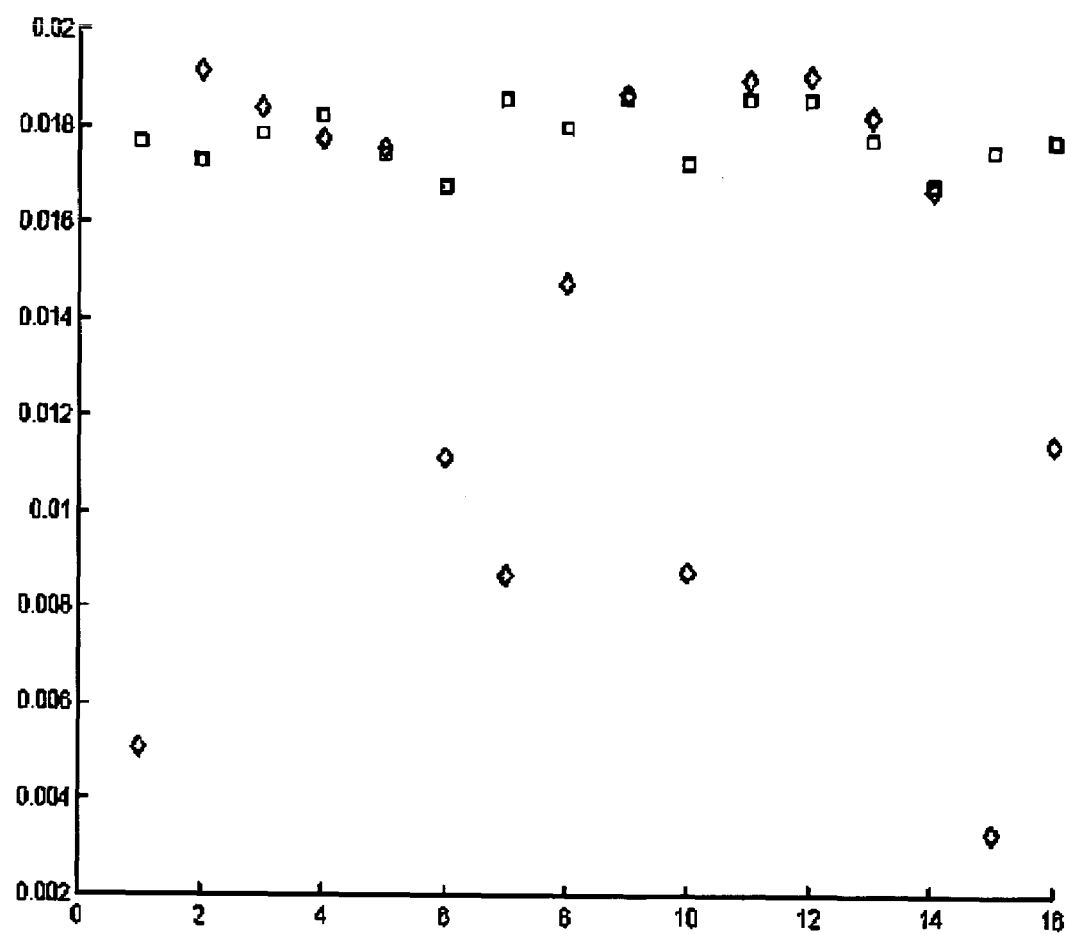

A third simulation solves a network localization with 4,000 sensors, where the iterative distributed SDP method terminates in five rounds, see FIGS. 8a, 8b, and 8c for rounds 1, 3 and 5. In this simulation, the entire sensor region is partitioned into 10×10 equal-sized squares, that is, 100 clusters, and the radio range is set at 0.035. FIG. 8d shows the actual error in position estimation and the estimated error using the individual traces. The total solution time for the five round computations on the single Pentium 1.2 GHz and 500 MB PC, excluding computing $\hat{d}_{ij}$, is about four minutes.

It can be seen from the above very limited examples of some embodiments of the current invention that the current invention advances the relevant art substantially. According to these embodiments of the current invention, the localization problem can be solved efficiently, accurately and with great knowledge of the accuracy of the results.

There are many other embodiments of the current invention or their variations that are not illustrated in the examples. For instance, there are various ways of defining clusters in a distributed SDP method that are not illustrated in the examples. All sensors in the examples are located in square areas but the overall sizes or shapes of the sensor networks are irrelevant to the embodiments of the current invention. Any of these embodiments or variations do not depart from the spirit and scope of the invention, as defined in the claims. They are still part of the current invention.

What is claimed is:

1. A method for estimating positions of unknown sensors in a sensor network, wherein the sensor network comprises at least two known sensors and at least one unknown sensor in continuous space, wherein the distances between any two sensors among the sensors are known within a measurement error or known to be greater than a range, the method comprising:

receiving data indicating positions of known sensors;
receiving data indicating distance between two sensors;
setting up a semidefinite program problem having a semidefinite relaxation wherein the unknown variables comprises the position coordinates in continuous space of the unknown sensors; and
solving the semidefinite program problem using a convex optimization wherein the solution of the unknown variables comprises the position coordinates in continuous space of the unknown sensors.

2. The method in claim 1, wherein setting up a semidefinite program problem having a semidefinite relaxation comprises:
converting a 2n-unknown variables problem into an optimization problem with $2n+n(n+1)/2$ unknown variables, wherein n is the number of unknown sensors.

3. The method in claim 1, wherein the Semidefinite Program (SDP) problem having a semidefinite relaxation comprising:
an SDP problem of finding Z, for an (n+2)x(n+2) matrix min.

$\sum_{i,j \in N_e, i<j}(\alpha_{ij}^+ + \alpha_{ij}^-) + \sum_{k,j \in N_e}(\alpha_{kj}^+ + \alpha_{kj}^-) + \sum_{i,j \in N_l, i<j}\beta_{ij} + \sum_{k,j \in N_l}\beta_{kj} + \sum_{i,j \in N_u, i<j}\beta_{ij}^+ + \sum_{k,j \in N_u}\beta_{kj}^+$ $(1;0;0)^T Z(1;0;0)=1$ $(0;1;0)^T Z(0;1;0)=1$ $(1;1;0)^T Z(1;1;0)=2$ $(0;e_{ij})^T Z(0;e_{ij}) - \alpha_{ij}^+ + \alpha_{ij}^- = (\hat{d}_{ij})^2, \forall i,j \in N_e, i<j,$ $(a_k;e_j)^T Z(a_k;e_j) - \alpha_{kj}^+ + \alpha_{kj}^- = (\hat{d}_{kj})^2, \forall k,j \in N_e,$ $(0;e_{ij})^T Z(0;e_{ij}) + \beta_{ij}^- \geq (\underline{r}_{ij})^2, \forall i,j \in N_l, i<j,$ $(a_k;e_j)^T Z(a_k;e_j) + \beta_{kj}^- \geq (\underline{r}_{kj})^2, \forall k,j \in N_l,$ $(0;e_{ij})^T Z(0;e_{ij}) - \beta_{ij}^+ \geq (\overline{r}_{ij})^2, \forall k,j \in N_u,$ $(a_k;e_j^T Z(a_k;e_j) - \beta_{kj}^+ \geq (\overline{r}_{kj})^2, \forall k,j \in N_u, \alpha_{ij}^+, \alpha_{ij}^-, \alpha_{kj}^+, \alpha_{kj}^-, \beta_{ij}^-, \beta_{kj}^-, \beta_{ij}^+, \beta_{kj}^+ \geq 0,$ $Z \succeq 0,$ wherein the semidefinite relaxation is relaxing Z=0 to Z⪰0;
wherein $a_k$ is a 2x1 vector of the position of k'th known sensor,
$\hat{d}_{ij}$ and $\hat{d}_{kj}$ are distances between unknown sensor i and unknown sensor j; and known sensor k and unknown sensor j,
$\underline{r}_{ij}$, $\underline{r}_{kj}$, $\overline{r}_{ij}$ and $\overline{r}_{kj}$ are lower bounds and upper bounds of distances between respective sensors, and
$e_{ij}$ is a vector with 1 at the i th position, −1 at the j th position and zero everywhere else; and $e_j$ is the vector of all zero except −1 at the j th position; and
wherein Z contains the position estimations of n unknown sensors, where $$Z := \begin{pmatrix} I & X \\ X^T & Y \end{pmatrix},$$

X =[$x_1$ $x_2$ ... $x_n$] is a 2xn matrix of the position estimations of n unknown sensors, and Y is an nxn matrix.

4. The method in claim 1, further comprising:
using the semidefinite relaxation as an indication of the accuracy of the estimation of positions of the unknown sensors.

5. The method in claim 3, further comprising:
calculating a $$\text{Trace}(\overline{Y} - \overline{X}^T \overline{X}) = \sum_{j=1}^{n}(\overline{Y}_{jj} - \|\overline{x}_j\|^2)$$

as an indication of the accuracy of the solution of position estimations of the unknown sensors.

6. The method of claim 5, further comprising:
indicating a solution found if the trace is less than or equal to an estimation error threshold; and
indicating a solution not found if the trace is greater than the estimation error threshold.

7. The method of claim 3, further comprising:
calculating individual trace of $\overline{Y}_{jj} - \|\overline{x}_j\|^2$, and
indicating solution found for j'th unknown sensor when the individual trace for j'th unknown sensor is less than an individual estimate error threshold.

8. The method of claim 7, further comprising:
indicating no solution for j'th unknown sensor if the individual trace for j'th unknown sensors is not less than an individual estimate error threshold after predetermined number of interactions.

9. The method of claim 1, further comprising:
dividing the sensors in the sensor network into a plurality of clusters; and
estimating the positions of the unknown sensors within at least two clusters independently, wherein each cluster sets up the semidefinite program problem having a semidefinite relaxation and solves the semidefinite program problem using a convex optimization.

10. The method of claim 9,
wherein each cluster has substantially equal area and equal number of known sensors.

11. The method of claim 9,
wherein each cluster has substantially a first number of known sensors and substantially a second number of unknown sensors, wherein the first number is at least 2.

12. The method of claim 9,
wherein the plurality of clusters comprise a plurality of first clusters, each first cluster having substantially a third number of known sensors and substantially a fourth number of unknown sensors;
wherein some or none unknown sensors are not within any first clusters; and
wherein the third number is at least 2.

13. The method of claim 12, wherein the third number is 3 to 10, and the fourth number is 20-100.

14. The method of claim 9, further comprising:
calculating an individual position estimation error using the semidefinite relaxation for each unknown sensor in each cluster;
treating unknown sensor with estimated position as known sensor, if the individual position estimation error of the unknown sensor is less than an individual estimation error threshold; and
re-dividing the network into clusters with more known sensors and fewer unknown sensors, and re-estimating remaining unknown sensors.

15. The method of claim 14,
wherein the individual position estimation error for j'th unknown sensor is individual trace $\overline{Y}_{jj} - \|\overline{x}_j\|^2$.

16. The method of claim 15, further comprising:
repeating the steps of calculating, treating and re-dividing until no unknown sensors left or until a predetermined number of iterations has been reached; and
indicating any remaining unknown sensors as having no solution.

17. A control station of a sensor network of known and unknown sensors in continuous space, the control station comprising:
a communication interface operable to exchange data with known or unknown sensors indicating distances between two sensors in the network, and positions of known sensors; and
a control module coupled to the communication interface, wherein the control module has a semidefinite program with a semidefinite relaxation wherein the unknown variables comprises the position coordinates in continuous space of the unknown sensors; and
wherein the control module is operable to solve the semidefinite program problem using the convex optimization wherein the solution of the unknown variables comprises the position coordinates in continuous space of the unknown sensors.

18. The control station of claim 17,
wherein the control module is operable to convert a 2n-unknown variables problem into an optimization problem with 2n+n(n+1)/2 unknown variables, wherein n is the number of unknown sensors.

19. The control station in claim 17, wherein the Semidefinite Program (SDP) problem having a semidefinite relaxation comprising:
an SDP problem of finding Z, for an (n+2) x (n+2) matrix min.

$$\Sigma_{i,j \in N_e, i<j}(\alpha_{ij}^+ + \alpha_{ij}^-) + \Sigma_{k,j \in N_e}(\alpha_{kj}^+ + \alpha_{kj}^-) + \Sigma_{i,j \in N_l, i<j}\beta_{ij}^- + \Sigma_{k,j \in N_l}\beta_{kj}^- + \Sigma_{i,j \in N_u, i<j}\beta_{ij}^+ + \Sigma_{k,j \in N_u}\beta_{kj}^+$$

$(1;0;0)^T Z(1;0;0)=1$ $(0;1;0)^T Z(0;1;0)=1$ $(1;1;0)^T Z(1;1;0)=2$ $(0;e_{ij})^T Z(0;e_{ij}) - \alpha_{ij}^+ + \alpha_{ij}^- = (\hat{d}_{ij})^2, \forall i,j \in N_e, i<j,$ $(a_k;e_j)^T Z(a_k;e_j) - \alpha_{kj}^+ + \alpha_{kj}^- = (\hat{d}_{kj})^2, \forall k,j \in N_e,$ $(0;e_{ij})^T Z(0;e_{ij}) + \beta_{ij}^- \geq (\underline{r}_{ij})^2, \forall i,j \in N_l, i<j,$ $(a_k;e_j)^T Z(a_k;e_j) + \beta_{kj}^- \geq (\underline{r}_{kj})^2, \forall k,j \in N_l,$ $(0;e_{ij})^T Z(0;e_{ij}) - \beta_{ij}^+ \geq (\overline{r}_{ij})^2, \forall k,j \in N_u,$ $(a_k;e_j)^T Z(a_k;e_j) - \beta_{kj}^+ \geq (\overline{r}_{kj})^2, \forall k,j \in N_u, \alpha_{ij}^+, \alpha_{ij}^-, \alpha_{kj}^+, \alpha_{kj}^-, \beta_{ij}^-, \beta_{kj}^-, \beta_{ij}^+, \beta_{kj}^+ \geq 0,$ $Z \succeq 0,$ wherein the semidefinite relaxation is relaxing Z=0 to Z≥0;
wherein $a_k$ is a 2x1 vector of the position of k'th known sensor,
$\hat{d}_{ij}$ and $\hat{d}_{kj}$ are distances between unknown sensor i and unknown sensor j; and known sensor k and unknown sensor j,
$\underline{r}_{ij}, \underline{r}_{kj}, \overline{r}_{ij}$ and $\overline{r}_{kj}$ are lower bounds and upper bounds of distances between respective sensors, and
$e_{ij}$ is a vector with 1 at the i th position, −1 at the j th position and zero everywhere else; and $e_j$ is the vector of all zero except −1 at the j th position; and
wherein Z contains the position estimations of n unknown sensors, where $$Z := \begin{pmatrix} I & X \\ X^T & Y \end{pmatrix},$$

$X = [x_1 \ x_2 \ldots x_n]$ is a 2xn matrix of the position estimations of n unknown sensors, and Y is an nxn matrix.

20. The control station in claim 17, wherein the control module is further operable to use the semidefinite relaxation as an indication of the accuracy of the estimation of positions of the unknown sensors.

21. The control station in claim 19, the control module is further operable to:
calculate a $$\text{Trace}(\overline{Y} - \overline{X}^T \overline{X}) = \sum_{j=1}^{n} (\overline{Y}_{jj} - \|\overline{x}_j\|^2)$$

as an indication of the accuracy of the solution of position estimations of the unknown sensors.

22. The control station in claim 21, wherein the control module is further operable to:
indicate a solution found if the trace is less than or equal to an estimation error threshold; and
indicate a solution not found if the trace is greater than the estimation error threshold.

23. The control station in claim 19, wherein the control module is further operable to:
calculate individual trace of $\overline{Y}_{jj}-\|\overline{x}_j\|^2$, and
indicate solution found for j'th unknown sensor when the individual trace for j'th unknown sensor is less than an individual estimate error threshold.

24. The control station of claim 23, the control module is further operable to:
indicate no solution for j'th unknown sensor if the individual trace for j'th unknown sensors is not less than an individual estimate error threshold after predetermined number of interactions.

25. The control station in claim 17, wherein the control module is further operable to:
divide the sensors in the sensor network into a plurality of clusters; and
estimate the positions of the unknown sensors within at least two clusters independently, wherein each cluster sets up the semidefinite program problem having a semidefinite relaxation and solves the semidefinite program problem using a convex optimization.

26. The control station in claim 25, wherein each cluster has substantially equal area and equal number of known sensors.

27. The control station in claim 25,
wherein each cluster has substantially a first number of known sensors and substantially a second number of unknown sensors, wherein the first number is at least 2.

28. The control station of claim 25, wherein the control module is further operable to:
calculate an individual position estimation error using the semidefinite relaxation for each unknown sensor in each cluster;
treat each unknown sensor with estimated position as known sensor, if the individual position estimation error of the unknown sensor is less than an individual estimation error threshold; and
re-divide the network into clusters with more known sensors and fewer unknown sensors, and re-estimating remaining unknown sensors.

29. The control station of claim 28, wherein the individual position estimation error for j'th unknown sensor is individual trace $\overline{Y}_{jj}-\|\overline{x}_j\|^2$.

30. The control station of claim 29, wherein the control module is further operable to:
repeat the steps of calculating, treating and re-dividing until no unknown sensors left or until a predetermined number of iterations has been reached; and
indicate any remaining unknown sensors as having no solution.

31. A sensor network comprising:
a plurality of known and unknown sensors in continuous space, wherein each sensor has a network interface to exchange data with one or more other sensors; and
a control station, operable to exchange data with one or more sensors,
wherein the data comprise at least one distance between two sensors in the network or positions of known sensors;

wherein the control station comprises a control module having a semidefinite program with semidefinite relaxation wherein the unknown variables comprises the position coordinates in continuous space of the unknown sensors; and
wherein the control module is operable to solve the semidefinite program problem using the convex optimization wherein the solution of the unknown variables comprises the position coordinates in continuous space of the unknown sensors.

32. The sensor network of claim 31,
wherein the control module is operable to convert a 2n-unknown variables problem into an optimization problem with 2n+n(n+1)/2 unknown variables, wherein n is the number of unknown sensors.

33. The sensor network in claim 31, wherein the Semidefinite Program (SDP) problem having a semidefinite relaxation comprising:
an SDP problem of finding Z, for an (n+2) x (n+2) matrix min.

$$\Sigma_{i,j\in N_e, i<j}(\alpha_{ij}^+ + \alpha_{ij}^-) + \Sigma_{k,j\in N_e}(\alpha_{kj}^+ + \alpha_{kj}^-) + \Sigma_{i,j\in N_l, i<j}\beta_{ij}^- + \Sigma_{k,j\in N_l}\beta_{kj}^- + \Sigma_{i,j\in N_u, i<j}\beta_{ij}^+ + \Sigma_{k,j\in N_u}\beta_{kj}^+$$

$(1;0;0)^T Z(1;0;0)=1$ $(0;1;0)^T Z(0;1;0)=1$ $(1;1;0)^T Z(1;1;0)=2$ $(0;e_{ij})^T Z(0;e_{ij}) - \alpha_{ij}^+ + \alpha_{ij}^- = (\hat{d}_{ij})^2, \forall i,j\in N_e, i<j,$ $(a_k;e_j)^T Z(a_k;e_j) - \alpha_{kj}^+ + \alpha_{kj}^- = (\hat{d}_{kj})^2, \forall k,j\in N_e,$ $(0;e_{ij})^T Z(0;e_{ij}) + \beta_{ij}^- \geq (\underline{r}_{ij})^2, \forall i,j\in N_l, i<j,$ $(a_k;e_j)^T Z(a_k;e_j) + \beta_{kj}^- \geq (\underline{r}_{kj})^2, \forall k,j\in N_l,$ $(0;e_{ij})^T Z(0;e_{ij}) - \beta_{ij}^+ \geq (\bar{r}_{ij})^2, \forall k,j\in N_u,$ $(a_k;e_j^T Z(a_k;e_j) - \beta_{kj}^+ \geq (\bar{r}_{kj})^2, \forall k,j\in N_u \, \alpha_{ij}^+, \alpha_{ij}^-, \alpha_{kj}^+, \alpha_{kj}^-,$
$\beta_{ij}^-, \beta_{kj}^-, \beta_{ij}^+, \beta_{kj}^+ \geq 0,$ $Z \succeq 0,$ wherein the semidefinite relaxation is relaxing Z=0 to $Z\succeq 0$;
wherein $a_k$ is a 2x1 vector of the position of k'th known sensor,
$\hat{d}_{ij}$ and $\hat{d}_{kj}$ are distances between unknown sensor i and unknown sensor j; and known sensor k and unknown sensor j,
$\underline{r}_{ij}, \underline{r}_{kj}, \bar{r}_{ij}$ and $\bar{r}_{kj}$ are lower bounds and upper bounds of distances between respective sensors, and
$e_{ij}$ is a vector with 1 at the i th position, –1 at the j th position and zero everywhere else; and $e_j$ is the vector of all zero except –1 at the j th position; and
wherein Z contains the position estimations of n unknown sensors, where $$Z := \begin{pmatrix} I & X \\ X^T & Y \end{pmatrix},$$

$X = [x_1 \, x_2 \ldots x_n]$ is a 2xn matrix of the position estimations of n unknown sensors, and Y is an nxn matrix.

34. The sensor network in claim 31, wherein the control module is further operable to use the semidefinite relaxation as an indication of the accuracy of the estimation of positions of the unknown sensors.

35. The sensor network in claim 33, the control module is further operable to:
calculate a $$\text{Trace}(\bar{Y} - \bar{X}^T \bar{X}) = \sum_{j=1}^{n} (\bar{Y}_{jj} - \|\bar{x}_j\|^2)$$

as an indication of the accuracy of the solution of position estimations of the unknown sensors.

36. The sensor network in claim 31, further comprising:
one or more control stations, each operable to exchange data among the control stations, indicating known and unknown sensors within its neighborhood;
wherein each control station is operable to estimate the position of unknown sensors within its neighborhood.

37. The sensor network in claim 36,
wherein each control station is further operable to negotiate with other control stations to determine whether a known or unknown sensor stays within its neighborhood, if the known or unknown sensor is within the neighborhood of the other control stations.

38. The sensor network in claim 36,
wherein each control station is operable to exchange the determined positions of unknown sensors with other control stations.

39. The sensor network in claim 36,
wherein one control station is operable to divide the known and unknown sensors within its neighborhood into a plurality of clusters and to estimate the positions of the unknown sensors within at least two clusters independently.

40. The sensor network in claim 39, wherein each cluster has substantially equal area and equal number of known sensors.

41. The sensor network in claim 39,
wherein each cluster has substantially a first number of known sensors and substantially a second number of unknown sensors, wherein the first number is at least 2.

42. The sensor network in claim 39, wherein the control module in the control station is further operable to:
calculate an individual position estimation error using the semidefinite relaxation for each unknown sensor in each cluster;
treat each unknown sensor with estimated position as known sensor, if the individual position estimation error of the unknown sensor is less than an individual estimation error threshold; and
re-divide the neighborhood into clusters with more known sensors and fewer unknown sensors, and re-estimating remaining unknown sensors.

43. The sensor network in claim 31, wherein the control station is located on one of the known sensors.

44. A machine readable medium containing a machine executable program for performing the method as in any one of claims 1-16.

* * * * *